(12) United States Patent
Wang et al.

(10) Patent No.: US 12,010,677 B2
(45) Date of Patent: Jun. 11, 2024

(54) CANCELLATION OF SIDELINK DATA CHANNEL

(71) Applicant: QUALCOMM Incorporated, San Diego, CA (US)

(72) Inventors: Xiaojie Wang, Hillsborough, NJ (US); Xiaoxia Zhang, San Diego, CA (US); Piyush Gupta, Bridgewater, NJ (US); Jing Sun, San Diego, CA (US); Sony Akkarakaran, Poway, CA (US); Junyi Li, Fairless Hills, PA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 17/372,140

(22) Filed: Jul. 9, 2021

(65) Prior Publication Data
US 2023/0008396 A1    Jan. 12, 2023

(51) Int. Cl.
| H04W 72/1263 | (2023.01) |
| H04L 5/00 | (2006.01) |
| H04W 72/0453 | (2023.01) |
| H04W 72/20 | (2023.01) |
| H04W 72/23 | (2023.01) |

(52) U.S. Cl.
CPC ....... *H04W 72/1263* (2013.01); *H04L 5/0051* (2013.01); *H04W 72/0453* (2013.01); *H04W 72/20* (2023.01); *H04W 72/23* (2023.01)

(58) Field of Classification Search
None
See application file for complete search history.

(56) References Cited

U.S. PATENT DOCUMENTS

| 2017/0188391 A1 | 6/2017 | Rajagopal et al. |
| 2020/0037343 A1 | 1/2020 | He et al. |
| 2020/0092692 A1* | 3/2020 | Wang ................... H04W 76/14 |
| 2020/0305183 A1* | 9/2020 | Papasakellariou .. H04W 52/243 |

(Continued)

FOREIGN PATENT DOCUMENTS

| WO | WO-2020197645 A1 | 10/2020 |
| WO | WO-2020210333 A1 | 10/2020 |

OTHER PUBLICATIONS

International Search Report and Written Opinion—PCT/US2022/032787—ISA/EPO—dated Sep. 6, 2022.

*Primary Examiner* — Phirin Sam
(74) *Attorney, Agent, or Firm* — Holland & Hart LLP

(57) ABSTRACT

Methods, systems, and devices for wireless communications are described. A first user equipment (UE) may receive, from a base station, a first downlink control information (DCI) message which schedules a sidelink transmission from the first UE to a second UE on a first set of resources associated with a sidelink shared channel. The first UE may additionally receive a second DCI which indicates a second set of resources which are cancelled from the first set of resources. Based on the cancellation indication, the first UE may modify or cancel at least a portion of the sidelink transmission originally scheduled for the second UE, and may transmit the modified sidelink transmission over a portion of the first set of resources in accordance with the cancellation indication, the first DCI, and the second DCI.

30 Claims, 23 Drawing Sheets

(56) References Cited

U.S. PATENT DOCUMENTS

| | | | |
|---|---|---|---|
| 2021/0212106 A1 | 7/2021 | Farag et al. | |
| 2021/0321396 A1* | 10/2021 | Li | H04W 72/0446 |
| 2021/0345360 A1* | 11/2021 | Yeo | H04W 72/20 |
| 2022/0104197 A1* | 3/2022 | Li | H04W 72/0446 |
| 2022/0174682 A1* | 6/2022 | Li | H04W 72/1263 |
| 2022/0183030 A1* | 6/2022 | Lee | H04W 76/14 |
| 2022/0248376 A1* | 8/2022 | Hui | H04W 72/20 |
| 2022/0272742 A1* | 8/2022 | Xiang | H04L 5/0023 |
| 2022/0312438 A1* | 9/2022 | Yi | H04W 72/1263 |
| 2022/0386355 A1* | 12/2022 | Yi | H04W 72/569 |
| 2023/0073497 A1* | 3/2023 | Yi | H04W 72/23 |
| 2023/0232421 A1* | 7/2023 | Yi | H04B 7/088 |
| | | | 370/329 |
| 2023/0397219 A1* | 12/2023 | Papasakellariou | |
| | | | H04W 74/0833 |

\* cited by examiner

CANCELLATION OF SIDELINK DATA CHANNEL

TECHNICAL FIELD

The following relates to wireless communications, including sidelink data channel cancellation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support both access link and sidelink communications between devices. An access link refers to a communication link between a UE and a network node (e.g., a base station), and in some cases may be referred to as a Uu interface. A sidelink refers to a communication link between similar devices (e.g., between multiple UEs) and in some cases may be referred to as a PC5 interface. For example, a sidelink may support communications between multiple UEs (e.g., in a vehicle-to-everything (V2X) system, a vehicle-to-vehicle (V2V) system, a device-to-device (D2D) system, an industrial internet of things (IoT) deployment, among other examples). Efficient and reliable techniques for managing access link communication and sidelink communications enhance network efficiency and reliability.

SUMMARY

The described techniques relate to improved methods, systems, devices, and apparatuses that support sidelink data cancellation. In various aspects discussed herein, described techniques provide for signaling of cancellation indications to a user equipment (UE) or a group of UEs. Such a cancellation indication may instruct the UE or group of UEs to refrain from performing sidelink communications on a set of resources, or to modify previously scheduled sidelink communications over the set of resources. For example, a base station may transmit a first scheduling of sidelink resources via a first downlink control information (DCI) to a first UE. The base station may identify a high priority transmission that is to preempt the sidelink scheduling, and may send a cancellation indication to one or more sidelink UEs via a second DCI indicating that an allocation of one or more resources for sidelink communications has been canceled or modified. The first UE may receive the cancellation indication from the base station, and may modify the previously scheduled sidelink transmissions or may refrain from transmitting using the canceled resources based on the received sidelink cancellation indication.

A method for wireless communications at a first UE is described. The method may include receiving, from a base station, a first downlink control information scheduling a sidelink transmission by the first UE to a second UE on a first set of resources associated with a sidelink shared channel, receiving, from the base station, a second downlink control information including an indication of a second set of resources that are cancelled from the first set of resources for the sidelink transmission, modifying at least a portion of the sidelink transmission based on the received second downlink control information, and transmitting the modified sidelink transmission over a portion of the first set of resources in accordance with the first downlink control information and the second downlink control information.

An apparatus for wireless communications at a first UE is described. The apparatus may include at least one processor, memory coupled with the processor, and instructions stored in the memory. The instructions may be executable by the at least one processor to cause the apparatus to receive, from a base station, a first downlink control information scheduling a sidelink transmission by the first UE to a second UE on a first set of resources associated with a sidelink shared channel, receive, from the base station, a second downlink control information including an indication of a second set of resources that are cancelled from the first set of resources for the sidelink transmission, modify at least a portion of the sidelink transmission based on the received second downlink control information, and transmit the modified sidelink transmission over a portion of the first set of resources in accordance with the first downlink control information and the second downlink control information.

Another apparatus for wireless communications at a first UE is described. The apparatus may include means for receiving, from a base station, a first downlink control information scheduling a sidelink transmission by the first UE to a second UE on a first set of resources associated with a sidelink shared channel, means for receiving, from the base station, a second downlink control information including an indication of a second set of resources that are cancelled from the first set of resources for the sidelink transmission, means for modifying at least a portion of the sidelink transmission based on the received second downlink control information, and means for transmitting the modified sidelink transmission over a portion of the first set of resources in accordance with the first downlink control information and the second downlink control information.

A non-transitory computer-readable medium storing code for wireless communications at a first UE is described. The code may include instructions executable by at least one processor to receive, from a base station, a first downlink control information scheduling a sidelink transmission by the first UE to a second UE on a first set of resources associated with a sidelink shared channel, receive, from the base station, a second downlink control information including an indication of a second set of resources that are cancelled from the first set of resources for the sidelink transmission, modify at least a portion of the sidelink transmission based on the received second downlink control information, and transmit the modified sidelink transmission over a portion of the first set of resources in accordance with the first downlink control information and the second downlink control information.

In some examples of the method, apparatuses, and non-transitory computer-readable medium described herein, and the method, apparatuses, and non-transitory computer-readable medium may include further operations, features, means, or instructions for cancelling the sidelink transmission on the first set of resources based on the first set of resources at least partially overlapping in frequency with the second set of resources.

In some examples of the method, apparatuses, and non-transitory computer-readable medium described herein, and the method, apparatuses, and non-transitory computer-readable medium may include further operations, features, means, or instructions for determining a first frequency location in which the first set of resources may be overlapping with the second set of resources and a second frequency location in which the first set of resources may be non-overlapping with the second set of resources, pausing the sidelink transmission on the first set of resources at the first frequency location based on the cancellation message, and performing the sidelink transmission on the first set of resources at the second frequency location.

In some examples of the method, apparatuses, and non-transitory computer-readable medium described herein, performing the sidelink transmission on the first set of resources at the second frequency location may include operations, features, means, or instructions for transmitting one or more reference signals with the sidelink transmission, where the one or more reference signals may be for estimating a phase discontinuity based on the modifying at least a portion of the sidelink transmission.

In some examples of the method, apparatuses, and non-transitory computer-readable medium described herein, and the method, apparatuses, and non-transitory computer-readable medium may include further operations, features, means, or instructions for shifting a location of one or more information bits included in the sidelink transmission to a non-overlapping symbol on the first set of resources and cancelling the sidelink transmission on a portion of the first set of resources that may be at least partially overlapping in frequency with the second set of resources.

In some examples of the method, apparatuses, and non-transitory computer-readable medium described herein, and the method, apparatuses, and non-transitory computer-readable medium may include further operations, features, means, or instructions for cancelling the sidelink transmission on a portion of the first set of resources that may be at least partially overlapping in frequency with the second set of resources and rate matching around the cancelled portion of the first set of resources.

In some examples of the method, apparatuses, and non-transitory computer-readable medium described herein, and the method, apparatuses, and non-transitory computer-readable medium may include further operations, features, means, or instructions for cancelling the sidelink transmission on a portion of the first set of resources that may be at least partially overlapping in frequency with the second set of resources, where the sidelink transmission includes one or more sidelink transmissions of a sidelink control channel, the sidelink shared channel, or both.

Some examples of the method, apparatuses, and non-transitory computer-readable medium described herein may further include operations, features, means, or instructions for cancelling the sidelink transmission including a sidelink control channel transmission, a sidelink shared channel transmission, or both, that may be scheduled to occur before transmission of a demodulation reference signal on the first set of resources.

In some examples of the method, apparatuses, and non-transitory computer-readable medium described herein, and the method, apparatuses, and non-transitory computer-readable medium may include further operations, features, means, or instructions for determining that the modified sidelink transmission overlaps with a demodulation reference signal scheduled on the first set of resources and cancelling the sidelink transmission including the demodulation reference signal and one or more symbols following the demodulation reference signal, where the demodulation reference signal may be for performing channel estimation of the one or more symbols.

Some examples of the method, apparatuses, and non-transitory computer-readable medium described herein may further include operations, features, means, or instructions for cancelling the sidelink transmission based on a number of symbols associated with the demodulation reference signal, a channel fading rate, or both.

Some examples of the method, apparatuses, and non-transitory computer-readable medium described herein may further include operations, features, means, or instructions for modifying a transmission location of the demodulation reference signal on the first set of resources based on the cancelling of the sidelink transmission.

In some examples of the method, apparatuses, and non-transitory computer-readable medium described herein, and the method, apparatuses, and non-transitory computer-readable medium may include further operations, features, means, or instructions for cancelling the sidelink transmission on the first set of resources based on the first set of resources at least partially overlapping in frequency with the second set of resources.

In some examples of the method, apparatuses, and non-transitory computer-readable medium described herein, and the method, apparatuses, and non-transitory computer-readable medium may include further operations, features, means, or instructions for determining a channel coherence time of an uplink channel associated with the first set of resources and the second set of resources and cancelling the sidelink transmission on the first set of resources based on the channel coherence time.

In some examples of the method, apparatuses, and non-transitory computer-readable medium described herein, and the method, apparatuses, and non-transitory computer-readable medium may include further operations, features, means, or instructions for determining a first frequency location in which the first set of resources may be overlapping with the second set of resources and a second frequency location in which the first set of resources may be non-overlapping with the second set of resources, pausing the sidelink transmission on the first set of resources at the first frequency location based on the cancellation message, and resuming the sidelink transmission on the first set of resources at the second frequency location.

Some examples of the method, apparatuses, and non-transitory computer-readable medium described herein may further include operations, features, means, or instructions for modifying a location of transmission of a demodulation reference signal on the first set of resources based on the pausing and resuming of the sidelink shared channel transmission.

In some examples of the method, apparatuses, and non-transitory computer-readable medium described herein, the modifying the location of transmission includes preponing or postponing transmission of the demodulation reference signal based on the received second downlink control information.

Some examples of the method, apparatuses, and non-transitory computer-readable medium described herein may further include operations, features, means, or instructions for applying a first redundancy version to the sidelink transmission before the pausing of the sidelink transmission, and a second redundancy version to the sidelink transmission upon resuming the sidelink transmission, where the first redundancy version may be different from the second redundancy version.

In some examples of the method, apparatuses, and non-transitory computer-readable medium described herein, and the method, apparatuses, and non-transitory computer-readable medium may include further operations, features, means, or instructions for shifting a location of one or more information bits included in the sidelink shared channel transmission to a non-overlapping symbol on the first set of resources based on a redundancy version of the sidelink transmission and cancelling the sidelink transmission on the first set of resources that may be at least partially overlapping in frequency with the second set of resources.

In some examples of the method, apparatuses, and non-transitory computer-readable medium described herein, and the method, apparatuses, and non-transitory computer-readable medium may include further operations, features, means, or instructions for determining that the sidelink transmission overlaps with a demodulation reference signal scheduled on the first set of resources and cancelling the sidelink transmission including a demodulation reference signal and one or more symbols following the demodulation reference signal, where the demodulation reference signal may be for channel estimation of the one or more symbols.

Some examples of the method, apparatuses, and non-transitory computer-readable medium described herein may further include operations, features, means, or instructions for cancelling the sidelink transmission based on a channel coherence time associated with the first set of resources and the second set of resources.

Some examples of the method, apparatuses, and non-transitory computer-readable medium described herein may further include operations, features, means, or instructions for cancelling the sidelink shared channel transmission including the demodulation reference signal and at least a portion of a demodulation reference signal repetition in a previous or subsequent non-overlapping symbol and modifying a transmission location of the demodulation reference signal on the first set of resources based on the cancelling of the sidelink transmission.

In some examples of the method, apparatuses, and non-transitory computer-readable medium described herein, the modifying includes preponing or postponing transmission of the demodulation reference signal based on the cancellation message.

In some examples of the method, apparatuses, and non-transitory computer-readable medium described herein, and the method, apparatuses, and non-transitory computer-readable medium may include further operations, features, means, or instructions for determining that the sidelink transmission overlaps with at least one demodulation reference signal scheduled on the first set of resources, switching a location of a demodulation reference signal with a non-overlapping data symbol, and cancelling the non-overlapping data symbol based on the switching.

In some examples of the method, apparatuses, and non-transitory computer-readable medium described herein, the non-overlapping data symbol occurs prior to the demodulation reference signal.

In some examples of the method, apparatuses, and non-transitory computer-readable medium described herein, the non-overlapping data symbol occurs after the demodulation reference signal.

In some examples of the method, apparatuses, and non-transitory computer-readable medium described herein, and the method, apparatuses, and non-transitory computer-readable medium may include further operations, features, means, or instructions for determining that the sidelink transmission overlaps with a first demodulation reference signal scheduled on the first set of resources and cancelling all transmissions on the first set of resources based on the overlap with the first demodulation reference signal.

In some examples of the method, apparatuses, and non-transitory computer-readable medium described herein, the first downlink control information includes a first format of downlink control information for scheduling sidelink communications and the second downlink control information includes a second format of downlink control information for cancelling sidelink communications.

A method for wireless communications at a base station is described. The method may include transmitting, to a first UE, a first downlink control information scheduling a sidelink transmission by the first UE to a second UE on a first set of resources associated with a sidelink shared channel, transmitting, to the first UE, a second downlink control information including an indication of a second set of resources that are cancelled from the first set of resources for the sidelink transmission, and receiving, from the first UE, a modified transmission over a portion of the first set of resources in accordance with the first downlink control information and the second downlink control information.

An apparatus for wireless communications at a base station is described. The apparatus may include at least one processor, memory coupled with the at least one processor, and instructions stored in the memory. The instructions may be executable by the at least one processor to cause the apparatus to transmit, to a first UE, a first downlink control information scheduling a sidelink transmission by the first UE to a second UE on a first set of resources associated with a sidelink shared channel, transmit, to the first UE, a second downlink control information including an indication of a second set of resources that are cancelled from the first set of resources for the sidelink transmission, and receive, from the first UE, a modified transmission over a portion of the first set of resources in accordance with the first downlink control information and the second downlink control information.

Another apparatus for wireless communications at a base station is described. The apparatus may include means for transmitting, to a first UE, a first downlink control information scheduling a sidelink transmission by the first UE to a second UE on a first set of resources associated with a sidelink shared channel, means for transmitting, to the first UE, a second downlink control information including an indication of a second set of resources that are cancelled from the first set of resources for the sidelink transmission, and means for receiving, from the first UE, a modified transmission over a portion of the first set of resources in accordance with the first downlink control information and the second downlink control information.

A non-transitory computer-readable medium storing code for wireless communications at a base station is described. The code may include instructions executable by at least one processor to transmit, to a first UE, a first downlink control information scheduling a sidelink transmission by the first UE to a second UE on a first set of resources associated with a sidelink shared channel, transmit, to the first UE, a second downlink control information including an indication of a second set of resources that are cancelled from the first set of resources for the sidelink transmission, and receive, from the first UE, a modified transmission over a portion of the first set of resources in accordance with the first downlink control information and the second downlink control information.

DETAILED DESCRIPTION

Figure 1:
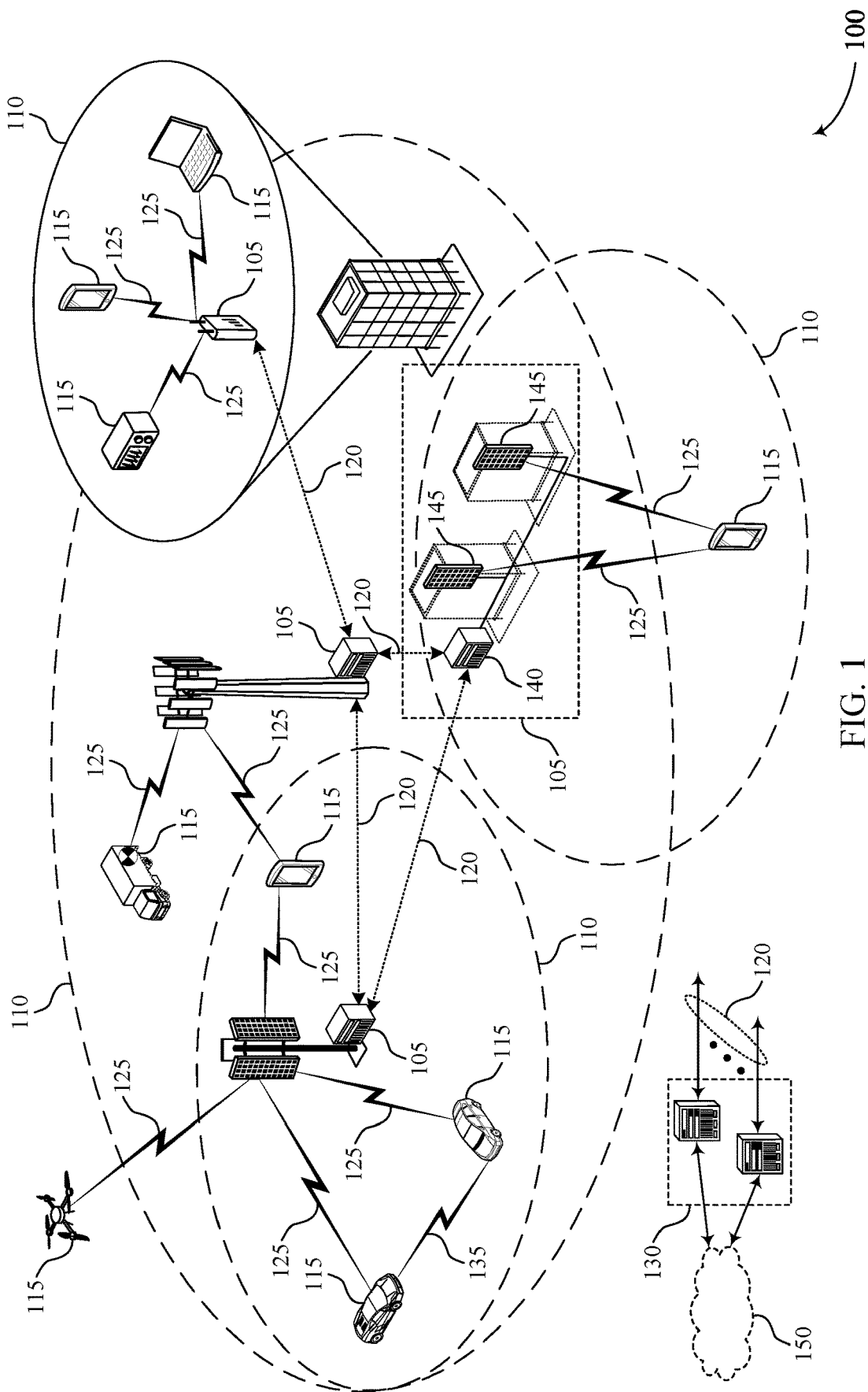
FIG. 1 illustrates an example of a wireless communications system that supports sidelink data cancellation in accordance with aspects of the present disclosure.

Some wireless communications systems, such as fifth generation (5G) systems, which may be referred to as New Radio (NR) systems, may support both access link and sidelink communications between devices. An access link (e.g., a Uu interface) may refer to a communication link between a network node (e.g., a base station) and a user equipment (UE). A sidelink (e.g., a PC5 interface) may refer to a communication link between user, relay, or end devices (e.g., a communication link between UEs). It is noted that while various examples provided herein are discussed for UE sidelink devices, such sidelink techniques may be used for any type of wireless devices that use sidelink communications. For example, a sidelink may support device-to-device (D2D) communications, vehicle-to-everything (V2X) or vehicle-to-vehicle (V2V) communications, industrial internet of things (IoT) communications, message relaying, discovery signaling, beacon signaling, or any combination of these or other signals transmitted over-the-air from one UE to one or more other UEs.

In some examples, a base station may allocate a number of uplink resources to schedule low priority transmissions (e.g., enhanced mobile broad band (eMBB) transmissions) from UEs in the wireless network. In some cases, however, the base station may identify higher priority transmissions (e.g., ultra-reliable low-latency communications (URLLC) transmissions) that are scheduled to overlap with the previously scheduled low priority transmissions, and the base station may cancel or otherwise alter the previously scheduled low-priority transmissions to expedite transmission of the higher priority message.

To mitigate or reduce interference and to increase reliability for high priority transmissions, a wireless communications system may signal a cancellation indication to instruct one or more UEs to refrain from performing sidelink communications on a set of resources, or to modify communications over the set of resources. In some examples, a base station may transmit a cancellation indication to one or more sidelink UEs indicating that certain sidelink resources that were allocated for sidelink communications among the UEs are canceled and thus the UEs are to refrain from transmitting or receiving on the indicated resources. In some implementations, the base station may transmit control signaling (e.g., a downlink control information (DCI) message) that includes the cancellation indication.

In accordance with various aspects of the present disclosure, a UE that receives a cancellation indication from a base station may perform a number of different cancellations based on the cancellation indication. In some cases, the UE may identify that the high priority sidelink transmission overlaps with sidelink control information (SCI) without overlapping with an associated demodulation reference signal (DMRS) on the sidelink channel. The UE may cancel SCI at the overlap (e.g., the UE may cancel all SCI, SCI and physical sidelink shared channel (PSSCH) mapped to the same symbol, or all of SCI before the first DMRS). In some other examples, the UE may cancel the SCI transmission and shift an information bit of the SCI or the UE may rate match around the canceled resources.

In some other cases, the high priority sidelink transmission may overlap with both scheduled SCI and DMRS transmissions. In such cases, the UE may cancel the DMRS and other symbols associated with the DMRS channel estimation, or the UE may shift the transmission location of the DMRS to accommodate the high priority transmission (e.g., the UE may prepone or postpone the DMRS such that the resource overlap is avoided).

In some other cases, the high priority sidelink transmission may overlap with a sidelink shared channel (PSSCH) transmission without overlapping with an associated DMRS. In such cases, the UE may cancel PSSCH at the overlap (e.g., cancel all PSSCH, or cancel all of PSSCH before the first DMRS). In some examples, the UE may pause the PSSCH transmission before the overlap and then resume the transmission after the overlap, or the UE may prepone or postpone the DMRS. In some cases, the UE may cancel the PSSCH based on a redundancy version (RV) identifier (ID) of the PSSCH transmission or based on channel coherence timing.

In some other cases, the high priority sidelink transmission may overlap with a transmission of PSSCH and DMRS. In such cases, the UE may cancel the DMRS and other symbols associated with the DMRS channel estimation, or the UE may shift the transmission location of the DMRS (e.g., preponing or postponing the cancelled portion of the DMRS). In some examples, the cancellation may be based on a channel coherence time, or the UE may swap the location of the DMRS and the data such that the DMRS is not cancelled.

Particular aspects of the subject matter described herein may be implemented to realize one or more of the following potential advantages. The techniques employed by the described wireless communications systems may provide benefits and enhancements to the operation of the wireless communications system. For example, the described techniques may include features improving a reliability of communications by mitigating or reducing interference between access links and sidelinks using sidelink cancellation indication signaling, and increasing the reliability for high priority and low latency communications. The described techniques include additional features for improving resource use, power consumption, battery life, and throughput, among other benefits.

Aspects of the disclosure are initially described in the context of wireless communications systems. Aspects of the disclosure are further illustrated by and described with reference to apparatus diagrams, system diagrams, sidelink cancellation indication resource configurations, a process flow, and flowcharts that relate to cancellation of a sidelink data channel.

FIG. 1 illustrates an example of a wireless communications system 100 that supports sidelink data cancellation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a a personal computer a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a base station 105 may allocate a number of uplink resources to schedule low priority transmissions from UEs 115 in the wireless communications system 100. In some cases, however, the base station 105 may identify higher priority transmissions that are scheduled to overlap with the previously scheduled low priority transmissions, and the base station may send a cancellation indication (e.g., a sidelink cancellation indication (SLCI)) using DCI to cancel or otherwise alter the previously scheduled low-priority transmissions.

In accordance with various aspects of the present disclosure, a UE 115 that receives a cancellation indication from a base station 105, the may UE may ins some cases identify that the high priority sidelink transmission overlaps with sidelink control information (SCI) without overlapping an associated demodulation reference signal (DMRS) on the sidelink channel. In such cases, the UE 115 may cancel SCI at the overlap in accordance with the SLCI. In some other examples, the UE 115 may cancel the SCI transmission and shift an information bit of the SCI or the UE may rate match around the canceled resources.

In some other cases, the high priority sidelink transmission may overlap with both scheduled SCI and DMRS transmissions. In such cases, the UE 115 may cancel the DMRS and other symbols associated with the DMRS channel estimation, or the UE 115 may shift the transmission location of the DMRS to accommodate the high priority transmission (e.g., the UE 115 may prepone or postpone the DMRS such that the resource overlap is avoided).

In some other cases, the high priority sidelink transmission may overlap with a sidelink shared channel (PSSCH) transmission without overlapping an associated DMRS, and the, the UE 115 may cancel PSSCH at the. In some examples, the UE 115 may pause the PSSCH transmission before the overlap and then resume the transmission after the overlap, or the UE 115 may prepone or postpone the DMRS. In some cases, the UE 115 may cancel the PSSCH based on a redundancy version (RV) identifier (ID) of the PSSCH transmission or based on channel coherence timing.

In some other cases, the high priority sidelink transmission may overlap with transmission of PSSCH and DMRS. In such cases, the UE 115 may cancel the DMRS and other symbols associated with the DMRS channel estimation, or the UE 115 may shift the transmission location of the DMRS (e.g., preponing or postponing the cancelled portion of the DMRS). In some examples, the cancellation may be based on a channel coherence time.

Figure 2:
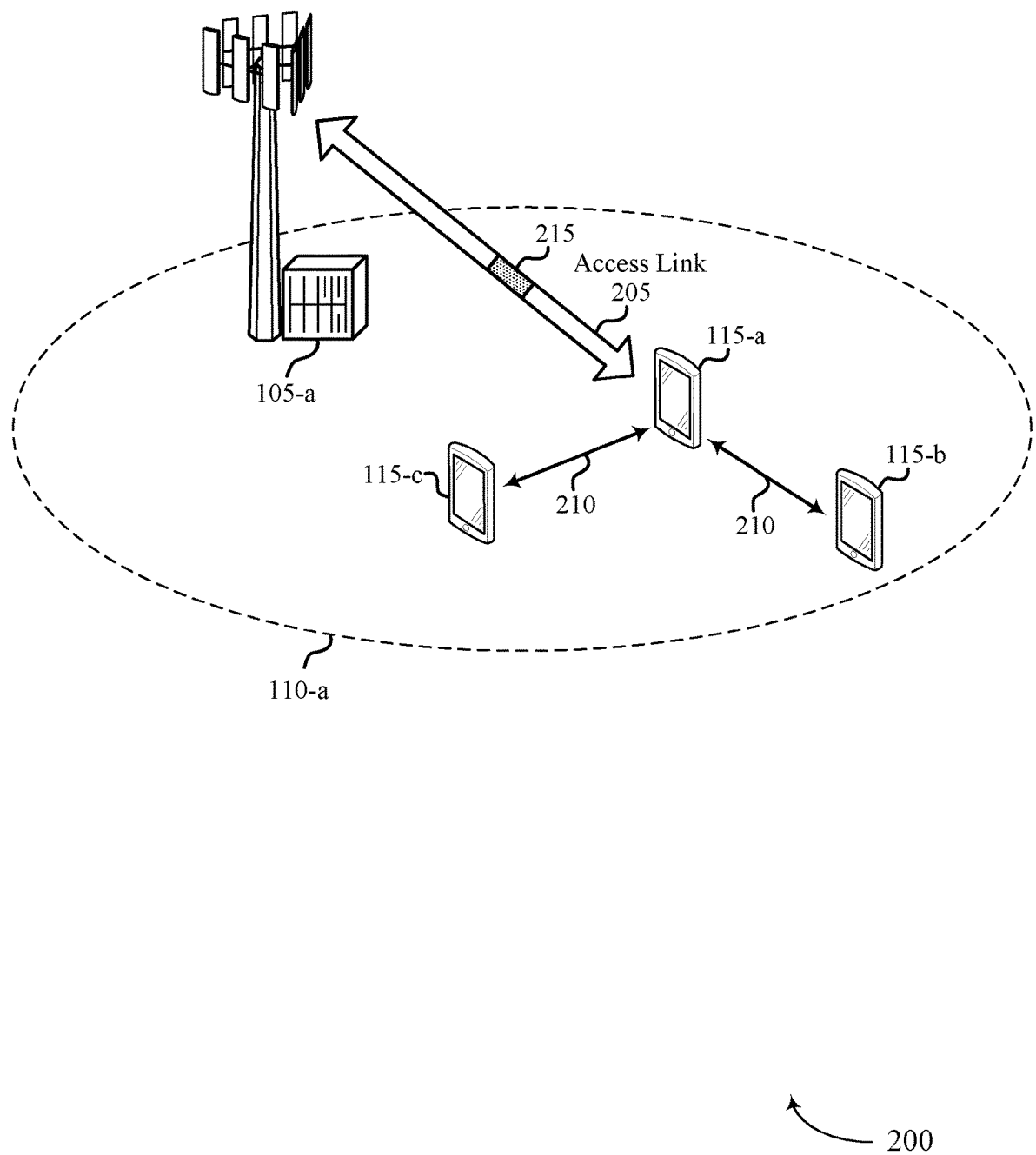
FIG. 2 illustrates an example of a wireless communications system that supports sidelink data cancellation in accordance with aspects of the present disclosure.

FIG. 2 illustrates an example of a wireless communications system 200 that supports sidelink data cancellation in accordance with aspects of the present disclosure. In some examples, the wireless communications system 200 may implement one or more aspects of a wireless communications system 100 as described with reference to FIG. 1. For example, the wireless communications system 200 may include a first UE 115-a, a second UE 115-b, and a third UE 115-c, which each may be examples of a UE 115 as described with reference to FIG. 1. The wireless communications system 200 may also include a base station 105-a which may be an example of a base station 105 as described with reference to FIG. 1. The base station 105-a may be associated with a cell that provides wireless communications service within a coverage area 110-a.

In some examples, the base station 105-a may communicate with the first UE 115-a via a first access link 205 (e.g., a Uu interface). In the example of FIG. 2, the second UE 115-b and the third UE 115-c may communicate with the first UE 115-a via sidelinks 210 which may be examples of a PC5 interface. In some examples, UEs 115 may operate using Mode 1 sidelink resource allocation in which the base station 105-a assigns transmission resources (e.g., PSSCH and physical sidelink control channel (PSCCH) resources) for sidelink communications (e.g., through DCI format 3_0).

In some cases, sidelink communications via the second UE 115-b and the third UE 115-c may interfere with communications over the first access link 205 between the first UE 115-a and the base station 105-a, or the base station 105-a may identify high priority low-latency communications that are to be sent to one or more of the UEs 115. For example, the base station 105-a may determine to transmit the high priority communications using resources that were previously allocated for sidelink communications. To mitigate or reduce interference and ensure high reliability for the high priority communications, the wireless communications system 200 may implement sidelink cancellation indication techniques to manage resources shared by access link and sidelink communications. In some cases, the base station 105-a may transmit a cancellation indication 215 to the first UE 115-a via the access link 205. The first UE 115-a may receive the cancellation indication 215 and determine, based on the cancellation indication 215, that resources previously scheduled for sidelink communications are to be allocated for the high priority communications. For example, in some cases the base station 105-a may determine that a set of time-frequency resources for a high priority transmission overlap time-frequency resources for sidelink communications between the second UE 115-b and the third UE 115-c. The base station 105-a may transmit cancellation indication 215 to the first UE 115-a via the access link 205 (e.g., and to the third UE 115-c in cases where an access link with the third UE 115-c is established), that indicates the overlapping set of time-frequency resources.

In some examples, the cancellation indication 215 may be provided as an uplink cancellation indication in DCI. For example, DCI format 2_4 may be used for multiple in-coverage UEs or DCI format 3_0 may be used for a specific in-coverage UE, with a payload that indicates resources being preempted, which the second UE 115-b may identify as sidelink resources. In some cases, the cancellation indication 215 may be provided in a sidelink-specific cancellation DCI that may be defined for longer term sidelink cancellation (e.g., cancellation may be in place until it is suspended; or can be seen as a modification of the sidelink resource pool). In some examples, the cancellation indication 215 may be provided in a system information block (SIB) to in-coverage UEs (e.g., in a SIB12 block transmitted to the second UE 115-a that indicates canceled sidelink resources). In some cases, the SIB may modify or update one or more sidelink resource pool configurations. In further examples, the cancellation indication 215 may be provided in a MAC-CE or in RRC signaling. In some cases, the MAC-CE, RRC signaling, or both, may be configured such that the MAC-CE and/or RRC are "always on" and periodically transmitted to in-coverage UEs 115 supporting sidelink, or selected UEs (e.g., second UE 115-b) that broadcast physical sidelink broadcast channel (PSBCH) (e.g., a syncRef UE), irrespective of whether sidelink resources are canceled for an associated time period. In other cases, the MAC-CE and/or RRC may be "on demand," and only transmitted if the base station 105-a intends to modify sidelink resources.

In some examples, the base station 105-a may use the cancellation indication 215 to cancel low-priority sidelink traffic to accommodate high priority transmissions over the access link 205. In some other examples, the base station 105-a may use the cancellation indication 215 to cancel low-priority sidelink traffic to accommodate high priority transmissions over one or more of the sidelinks 210. In some other examples, the base station 105-a may use the cancellation indication 215 to cancel one or more sidelink retransmissions over one or more of the sidelinks 210. The cancellation indication 215 may include various items of information related to the cancellation, which are discussed for several examples with reference to FIG. 3. In addition, a UE 115 may cancel sidelink transmissions (or stop and resume the communications) based on various factors such as DMRS location, channel coherence, phase continuity, or other considerations described in further detail with reference to FIGS. 4 through 6.

Figure 3:
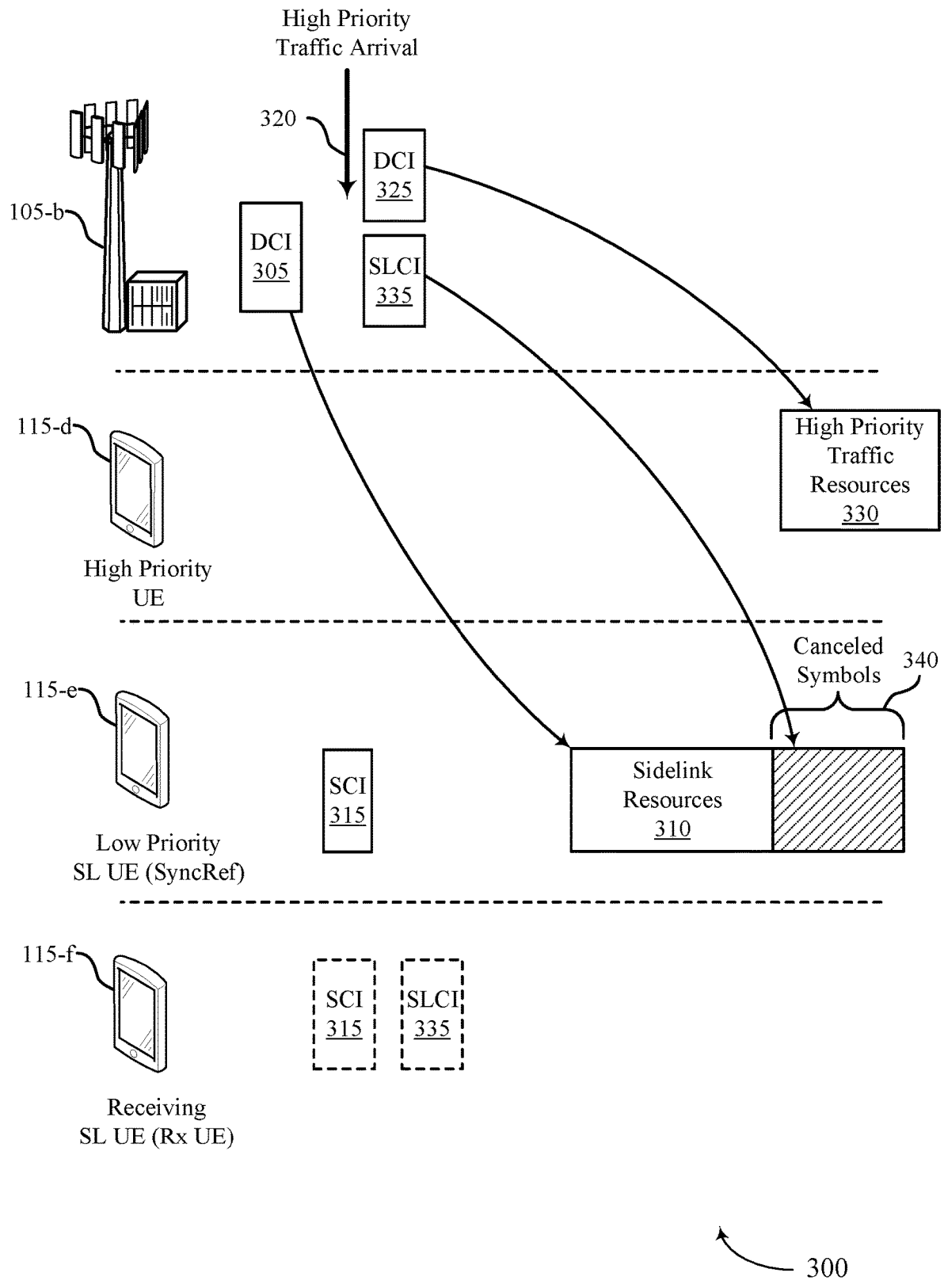
FIG. 3 illustrates an example of a sidelink cancellation indication configuration that supports sidelink data cancellation in accordance with aspects of the present disclosure.

FIG. 3 illustrates an example of a sidelink cancellation indication configuration 300 that supports sidelink data cancellation in accordance with aspects of the present disclosure. In some examples, the sidelink cancellation indication configuration 300 may implement aspects of a wireless communications systems 100 or 200. In this example, communications are illustrated for a base station 105-b, a high priority UE 115-d, a low priority sidelink UE 115-e, and an additional receiving sidelink UE 115-f, which may be examples of the corresponding devices as described herein. While separate UEs 115 are illustrated in this example as being the high priority UE 115-d and the low priority sidelink UE 115-e, techniques discussed herein are applicable generally to low priority traffic and high priority traffic. Thus, in some examples, a same UE 115 may transmit both high priority traffic and low priority traffic in accordance with techniques discussed herein.

In some examples, the base station 105-b may transmit control information in DCI 305 that indicates or activates a sidelink resource pool 310 for use in sidelink communications between the low priority sidelink UE 115-e and one or more other UEs such as the receiving sidelink UE 115-f In some cases, the sidelink resource pool 310 may be configured in configuration information (e.g., in RRC configuration information, in one or more SIBs, in one or more MAC-CEs, or any combinations thereof), and the DCI 305 may activate all or a portion of the configured sidelink resources. In the example of FIG. 3, the low priority sidelink UE 115-e may transmit sidelink control information (SCI) 315 to the receiving sidelink UE 115-f (and in some cases one or more other sidelink UEs) that indicates the available sidelink resources of the sidelink resource pool 310. The base station 105-b may identify a high priority traffic arrival 320 for high priority traffic associated with the high priority UE 115-d. In some cases, the base station 105-b may determine a set of high priority traffic resources 330 for the high priority traffic, and the high priority traffic resources 330 may overlap in time and frequency with all or a portion of the sidelink resource pool 310.

As discussed herein, sidelink transmissions that overlap with the high priority traffic resources 330 may be canceled in accordance with various described techniques in order to avoid interference between the high priority communications and the sidelink communications. In the example of FIG. 3, the base station 105-b may transmit a resource allocation for the high priority traffic resources 330 to the high priority UE 115-d in DCI 325, and the base station 105-b may transmit a sidelink cancellation indication (SLCI) 335 to the low priority sidelink UE 115-e (and in some cases to the additional receiving sidelink UE 115-f). In some cases, the SLCI 335 may be transmitted in a DCI (e.g., using DCI format 2_4 or 3_0) on a physical downlink control channel (PDCCH) of the access link between the base station 105-b and the low priority sidelink UE 115-e. The SLCI 335 may indicate the high priority traffic resources 330, may indicate one or more canceled symbols 340 of the sidelink resource pool 310, or both. The low priority sidelink UE 115-e may then refrain from sidelink communications using the canceled symbols 340. In accordance with various techniques provided herein, based on receiving the SLCI 335, and based on a sidelink channel structure (e.g., location of DMRS, location of high priority transmission overlap, location of SCI, etc.) and other factors such as channel coherence time, the UEs 115 may determine a hard cancellation method for cancelling or stopping and resuming the sidelink transmissions on the sidelink channel. An example of such a sidelink cancellation methods are discussed with reference to FIGS. 4-6.

Figure 4:
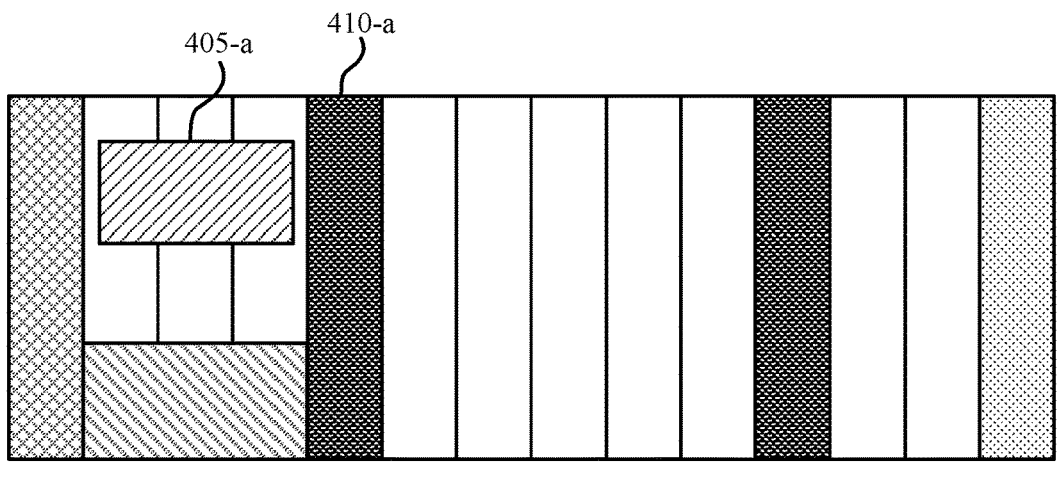
FIGS. 4-6 illustrate examples of sidelink cancellation resource configurations that support sidelink data cancellation in accordance with aspects of the present disclosure.
Figure 4:
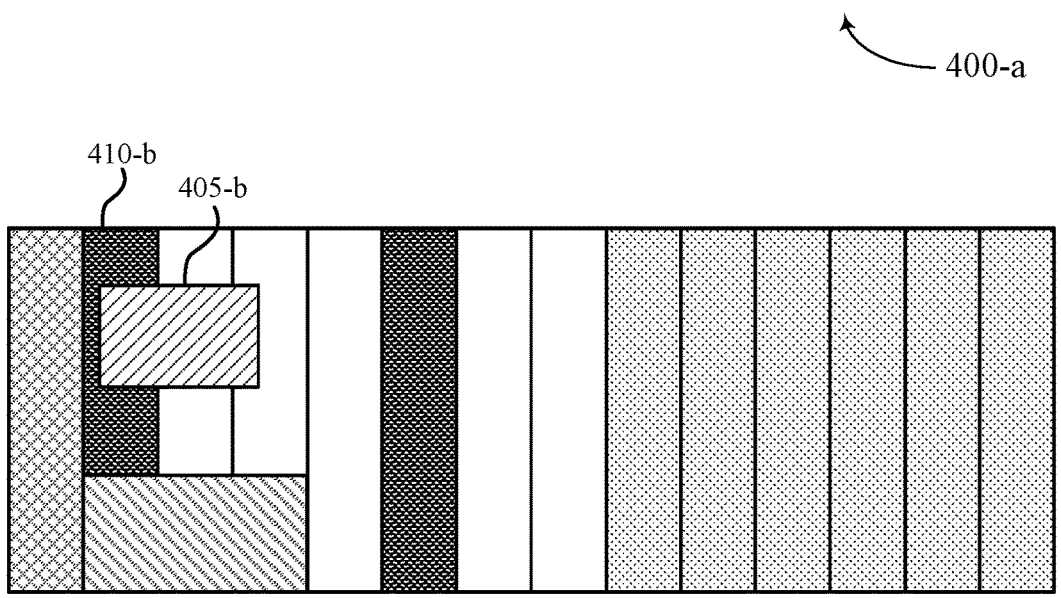

FIG. 4 illustrates an example of sidelink cancellation resource configurations 400-a and 400-b that support sidelink data cancellation in accordance with aspects of the present disclosure. For example, the sidelink cancellation resource configurations 400-a and 400-b may implement aspects of a wireless communications systems 100 or 200 and may be identified and implemented by a base station and one or more UEs, which may be examples of the corresponding devices as described herein.

Sidelink cancellation resource configurations 400-a and 400-b show examples of sidelink channel structures including a first symbol for automatic gain control (AGC calibration), resources allocated for sidelink control channel (e.g., physical sidelink control channel (PSSCH)) transmissions and sidelink data channel (e.g., physical sidelink shared channel (PSSCH)) transmissions, a number of symbols allocated for transmission of a DMRS, and a guard period. In sidelink cancellation resource configurations 400-a and 400-b, symbols allocated for transmission of the sidelink control channel may be used to transmit sidelink control information such as SCI-2.

In some examples, a high priority transmission may overlap with other sidelink transmissions on the sidelink channel, and a scheduling device such as a base station may determine a scheduling for transmitting the high priority data and coordinating or cancelling other lower priority data transmissions on the sidelink channel. The base station may transmit a SLCI to a UE which instructs the UE to cancel sidelink transmissions to accommodate the high priority transmission.

In the example of sidelink cancellation resource configuration 400-a, the high priority transmission 405-a may overlap with a sidelink control information (e.g., SCI-2) transmission without overlapping DMRS 410-a. In such cases, a UE may perform one or more different cancellations based on receiving a cancellation indication from the base station. The alternatives described may be performed individually or in combination, and may be paired with additional reference signal transmissions or power boosting to increase the reliability of the high priority transmission.

In a first alternative, the UE may cancel the sidelink control information (SCI-2) transmission in overlapping frequencies on the sidelink channel (e.g., the UE may cancel SCI-2 in overlapping symbols of high priority transmission 405-a). In some examples, the cancellation may be a hard cancellation without resumption (e.g., the base station may transmit DCI to cancel any scheduled PSSCH) a hard cancellation with resumption (e.g., the UE may cancel any transmission on overlapping symbols and then resumes transmissions on any non-overlapping symbols), a hard cancellation for all allocated resources (e.g., the UE may cancel all transmissions if an overlap occurs for resources allocated for the high priority transmission), a hard cancellation with resumption and additional reference signal (e.g., the UE may cancel any transmission on overlapping symbols and then resumes transmissions on any non-overlapping symbols with an additional reference signal for estimating a phase jump associated with the resumption), or any combination thereof.

In a second alternative, the UE may cancel the sidelink control information (SCI-2) transmission in the overlapping frequencies on the sidelink channel (e.g., the UE may cancel SCI-2 in overlapping symbols of the high priority transmission 405-a), and the UE may shift the transmission of one or more information bits to different subchannel or symbols of the sidelink channel based on the cancellation. For example, the UE may identify a number of data bits and a number of parity check bits associated with the sidelink control information transmission, and the UE may shift the transmission location of the one or more information bits while cancelling one or more of the parity check bits. In such cases, the UE prioritizes preserving transmission of the information bits instead of lower importance parity check bits of the sidelink control information. In addition, a beta offset parameter which identifies the resources allocated for SCI-2 may be unchanged based on the shift of the one or more information bits.

In a third alternative, the UE may cancel the sidelink control information (SCI-2) transmission in the overlapping frequencies on the sidelink channel (e.g., the UE may cancel SCI-2 in overlapping symbols of the high priority transmission 405-a), and the UE may perform transmission rate matching around the canceled resources. In such cases, the beta offset parameter may be associated with resources after cancellation.

In a fourth alternative, the UE may cancel all sidelink control information (SCI-2) transmissions if there is any identified overlap.

In a fifth alternative, the UE may cancel all sidelink control information (SCI-2) symbols and may partially cancel sidelink data (e.g., on the PSSCH) in which the PSSCH and sidelink control information are mapped to the same symbol.

In a sixth alternative, the UE may cancel all sidelink control information (SCI-2) and sidelink data transmissions on the PSSCH which are scheduled to occur before the first DMRS 410-a. In such cases, the UE may ensure accurate channel estimation after the cancellation. In the example of sidelink cancellation resource configuration 400-b, the high priority transmission 405-b may overlap with a sidelink control information (e.g., SCI-2) transmission and may also overlap with DMRS 410-b. In such cases, a UE may perform one or more different cancellations based on receiving a cancellation indication from the base station.

In such cases, the UE may cancel the sidelink control information (SCI-2) transmission in overlapping frequencies on the sidelink channel (e.g., the UE may cancel SCI-2 in overlapping symbols of the high priority transmission 405-b). In some examples, the cancellation may be a hard cancellation without resumption (e.g., the base station may transmit DCI to cancel any scheduled PSSCH) a hard cancellation with resumption (e.g., the UE may cancel any transmission on overlapping symbols and then resumes transmissions on any non-overlapping symbols), a hard cancellation for all allocated resources (e.g., the UE may cancel all transmissions if an overlap occurs for resources allocated for the high priority transmission), a hard cancellation with resumption and additional reference signal (e.g., the UE may cancel any transmission on overlapping symbols and then resumes transmissions on any non-overlapping symbols with an additional reference signal for estimating a phase jump associated with the resumption), or any combination thereof.

In cases where the DMRS 410-b is canceled, the symbols where channel estimation may be inaccurate may also be cancelled. In some examples, the cancellation may be based on the number of DMRS symbols present in the sidelink channel, the channel fading rate of the sidelink channel, or both. In some other cases, the UE may transmit the DMRS in another location on the sidelink channel (e.g., the transmission of the DMRS may be moved from the overlapping symbol to a different symbol of the sidelink channel).

Figure 5:
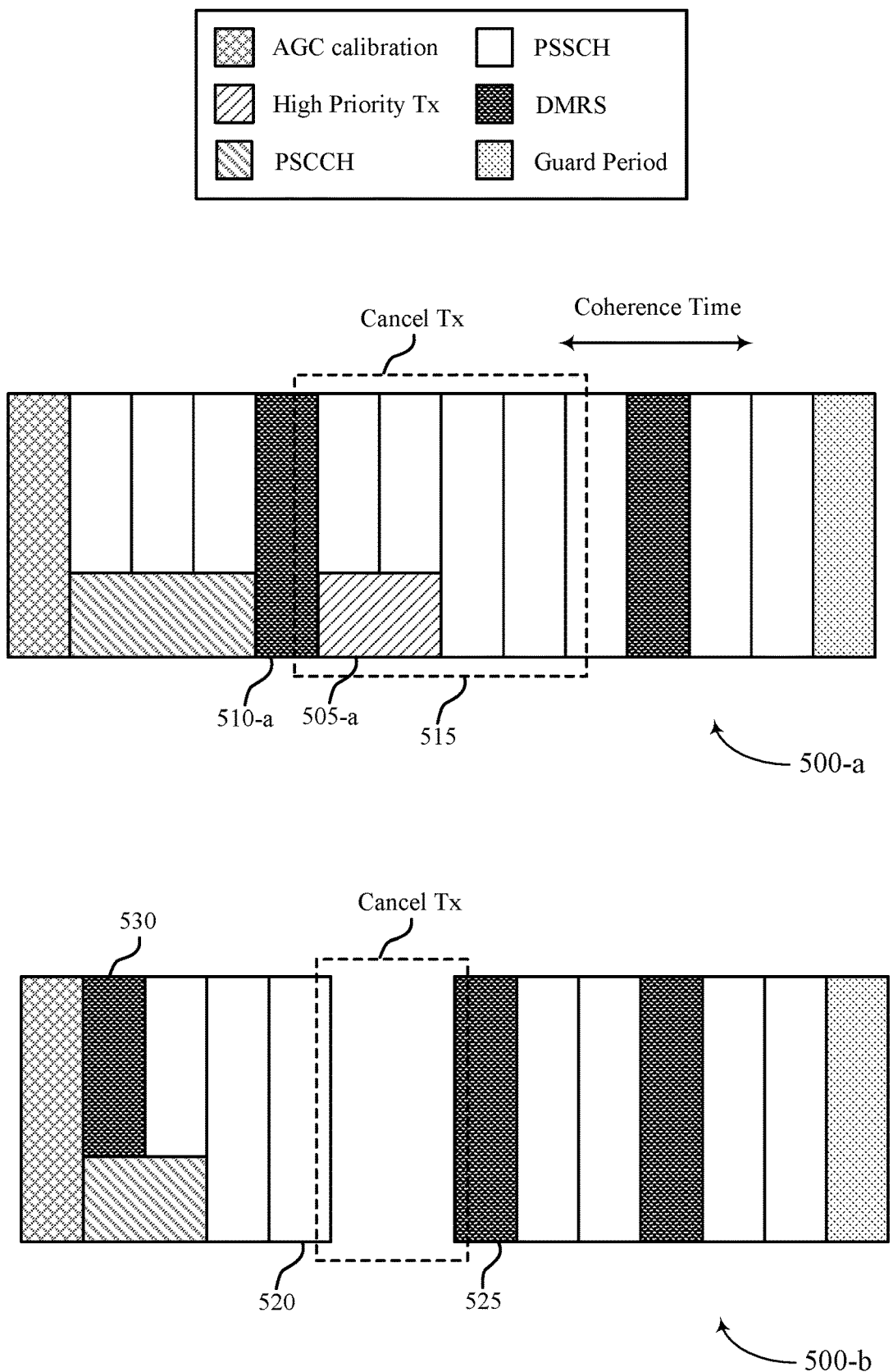

FIG. 5 illustrates an example of sidelink cancellation resource configurations 500-a and 500-b that support sidelink control cancellation in accordance with aspects of the present disclosure. For example, the sidelink cancellation resource configurations 500-a and 500-b may implement aspects of a wireless communications systems 100 or 200 and may be identified and implemented by a base station and one or more UEs, which may be examples of the corresponding devices as described herein.

Sidelink cancellation resource configurations 500-a and 500-b show examples of sidelink channel structures including a first symbol for AGC calibration, resources allocated for sidelink control channel (e.g., PSCCH) transmissions and sidelink data channel (e.g., PSSCH) transmissions, a number of symbols allocated for transmission of a DMRS, and a guard period. In sidelink cancellation resource configurations 500-a and 500-b, symbols allocated for transmission of the sidelink control channel may be used to transmit sidelink control information such as SCI-2.

In some examples, a high priority transmission may overlap with other sidelink transmissions on the sidelink channel, and a scheduling device such as a base station may determine a scheduling for transmitting the high priority data and coordinating or cancelling other lower priority data transmissions on the sidelink channel. The base station may transmit a SLCI to a UE which instructs the UE to cancel sidelink transmissions to accommodate the high priority transmission.

In the example of sidelink cancellation resource configuration 500-a, the high priority transmission 505-a may overlap with a sidelink data transmission after a first DMRS 510-a. In such cases, a UE may perform one or more different cancellations based on receiving a cancellation indication from the base station. The alternatives described may be performed individually or in combination, and may be paired with additional reference signal transmissions or power boosting to increase the reliability of the high priority transmission.

In a first alternative, the UE may cancel the transmission on resources overlapping with the transmission of the high priority transmission 505-*a*. In a second alternative, the UE may cancel transmissions based on channel coherence time associated with the sidelink cancellation resource configuration 500-*a*. In some examples, however, channel estimation and time interpolation between DMRSs of the sidelink cancellation resource configuration 500-*a* may not be accurate or may not be performed due to a phase jump incurred by cancellation of the overlapped resources. In such cases, the UE may determine symbols in which channel estimation may be inaccurate based on the channel coherence time, and the UE may cancel transmissions on symbols in which the channel estimation may be inaccurate. In some examples, if the channel coherence time is a value such that interpolation cannot be performed by the UE, the UE may cancel transmissions at 515 up to the second to last symbol before transmission of a DMRS.

In the example of sidelink cancellation resource configuration 500-*b*, the high priority transmission may overlap with a sidelink data transmission. In such cases, a UE may stop or pause data transmissions at 520 before the scheduled overlap of the high priority transmission, and may resume transmissions after completion the overlap at 525. Based on pausing and resuming transmissions, and based on receiving a cancellation indication from the base station, the UE may in some cases pre-pone or postpone the transmission of the DMRS (e.g., front-loaded DMRS transmission). For example, instead of transmitting the DMRS at 520, the UE may transmit the DMRS at 530 before the cancelled resources, for example, in cases where phase continuity may not be maintained after pausing and resumption. In some other cases, the UE may postpone transmission of the DMRS to the resumed symbol 525.

In some other examples, the UE may cancel transmissions based on a redundancy version (RV) identifier (ID) of the scheduled transmission. For example, some RVs (e.g., RV 0/3) may include a greater number of systematic information bits (and a smaller number of error check or parity bits), and the UE may shift the information bits such that the cancellation occurs at the error check bits. In some examples, for example, RV 1 or 2, the UE may keep or shift "core parity" bits (low density parity check (LDPC) bits) and "special extension parity" bits while canceling some "extension parity" bits.

Additionally or alternatively, in some cases, the UE may pause transmissions associated with a first RV and may resume transmissions using a different RV after cancellation of the overlapped resources. For example, if a transmission occurring before the cancellation is associated with a first RV (e.g., RV 0), then the UE may resume a transmission with a different redundancy version (e.g., RV 1). In such cases, the base station will view the resumed transmission as a retransmission of the first transmission associated with the first RV.

Figure 6:
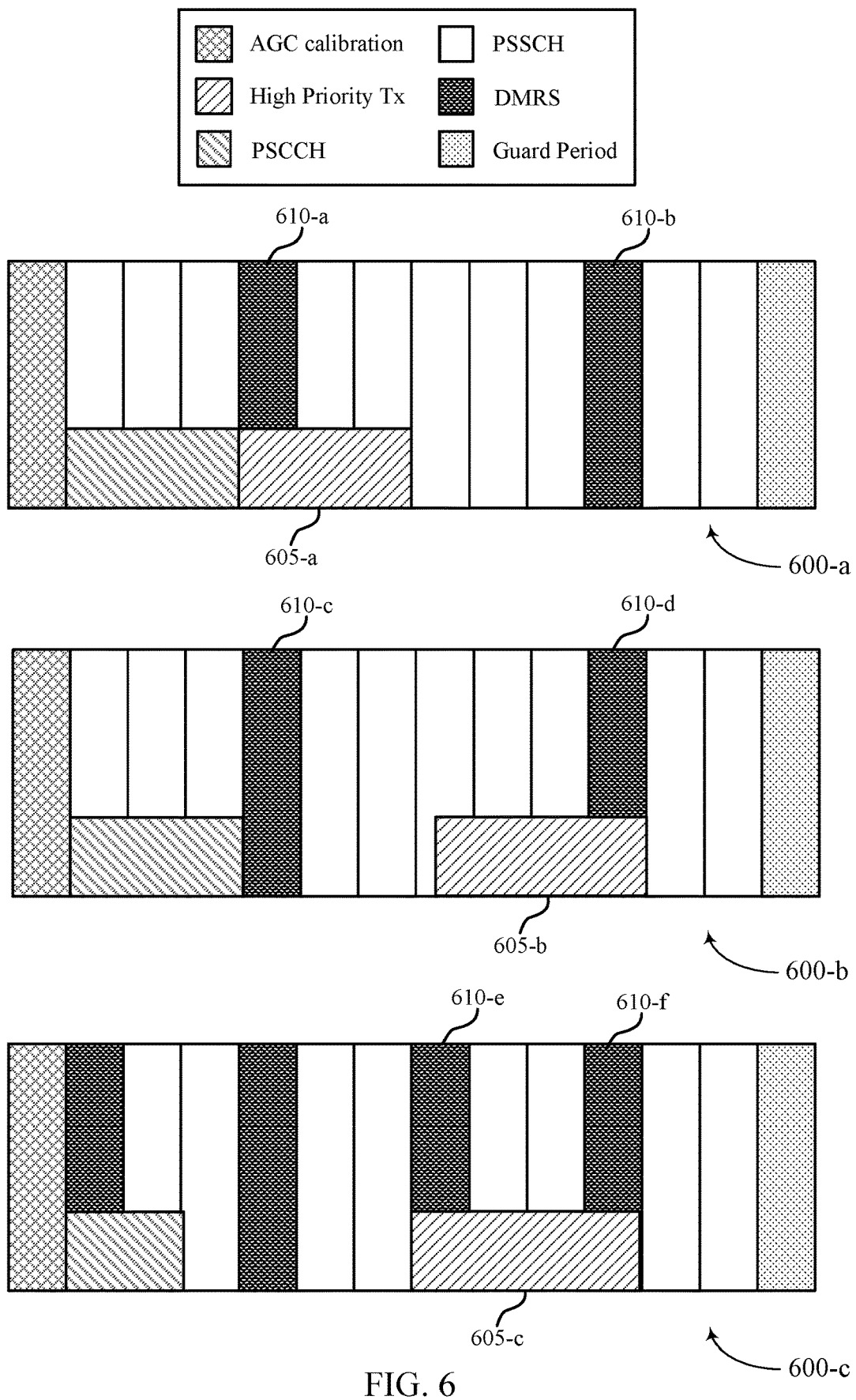

FIG. 6 illustrates an example of sidelink cancellation resource configurations 600-*a*, 600-*b*, and 600-*c* that support sidelink data cancellation in accordance with aspects of the present disclosure. For example, the sidelink cancellation resource configurations 600-*a*, 600-*b*, and 600-*c* may implement aspects of a wireless communications systems 100 or 200 and may be identified and implemented by a base station and one or more UEs, which may be examples of the corresponding devices as described herein.

Sidelink cancellation resource configurations 600-*a*, 600-*b*, and 600-*c* show examples of sidelink channel structures including a first symbol for AGC calibration, resources allocated for sidelink control channel (e.g., PSCCH) transmissions and sidelink data channel (e.g., PSSCH) transmissions, a number of symbols allocated for transmission of a DMRS, and a guard period. In sidelink cancellation resource configuration 600-*a*, 600-*b*, and 600-*c*, symbols allocated for transmission of the sidelink control channel may be used to transmit sidelink control information such as SCI-2.

In some examples, a high priority transmission may overlap with other sidelink transmissions and at least one DMRS on the sidelink channel, and a scheduling device such as a base station may determine a scheduling for transmitting the high priority data and coordinating or cancelling other lower priority data transmissions or DMRS on the sidelink channel. The base station may transmit a SLCI to a UE which instructs the UE to cancel sidelink transmissions to accommodate the high priority transmission.

In the example of sidelink cancellation resource configuration 600-*a*, the high priority transmission 605-*a* may overlap with a sidelink data transmission and a first DMRS 510-*a*. In such cases, a UE may perform one or more different cancellations based on receiving a cancellation indication from the base station. The alternatives described may be performed individually or in combination, and may be paired with additional reference signal transmissions or power boosting to increase the reliability of the high priority transmission.

In a first alternative, the UE may cancel all transmissions in which channel estimation is inaccurate. For example, in some cases channel estimation and time interpolation between DMRSs of the sidelink cancellation resource configuration 600-*a* may not be accurate or may not be performed due to a phase jump incurred by cancellation of the overlapped resources. In such cases, the UE may determine symbols in which channel estimation may be inaccurate (e.g., symbols after high priority transmission 605-*a* and before DMRS 610-*b*) based on the channel coherence time for overlapping with a first DMRS 610-*a* while a second DMRS 610-*b* is available for channel estimation. In some other examples (e.g., in cases where DMRS and PSSCH are FDM-ed and preponing the DMRS is not possible) the UE may cancel all transmissions on the sidelink channel that overlap with the high priority transmission.

In the example of sidelink cancellation resource configuration 600-*b*, the high priority transmission 605-*b* may overlap with a sidelink data transmission and a second DMRS 610-*d*. In such cases, the UE may cancel the symbols after the DMRS 610-*d*.

In some other cases, the UE may swap a DMRS symbol that would be overlapping with the high priority transmission with a data symbol (e.g., a subsequent data symbol or a previous data symbol), such that the high priority transmission no longer overlaps with the DMRS. The UE may apply the cancellation to the swapped data symbol. In some cases, the UE may postpone or prepone the DMRS symbol to avoid overlap with the high priority transmission.

In the example of sidelink cancellation resource configuration 600-*c*, the high priority transmission 605-*c* may overlap with a first DMRS 610-*e* and a second DMRS 610-*f*, which may in some examples be a DMRS repetition. In such cases, the UE may cancel transmissions on indicated resources with (partial or all) DMRS repetition in a subsequent non-overlapping symbol or the previous non-overlapping symbol. In cases where at least a portion of the DMRS is cancelled, the DMRS may be preponed or postponed to the non-overlapping symbol.

In some cases, the location of one or more DMRS may be shifted by ±1 symbols to avoid overlap with the high priority transmission (e.g., DMRS may be transmitted in a symbol before or after when it is scheduled in cases of overlap).

Figure 7:
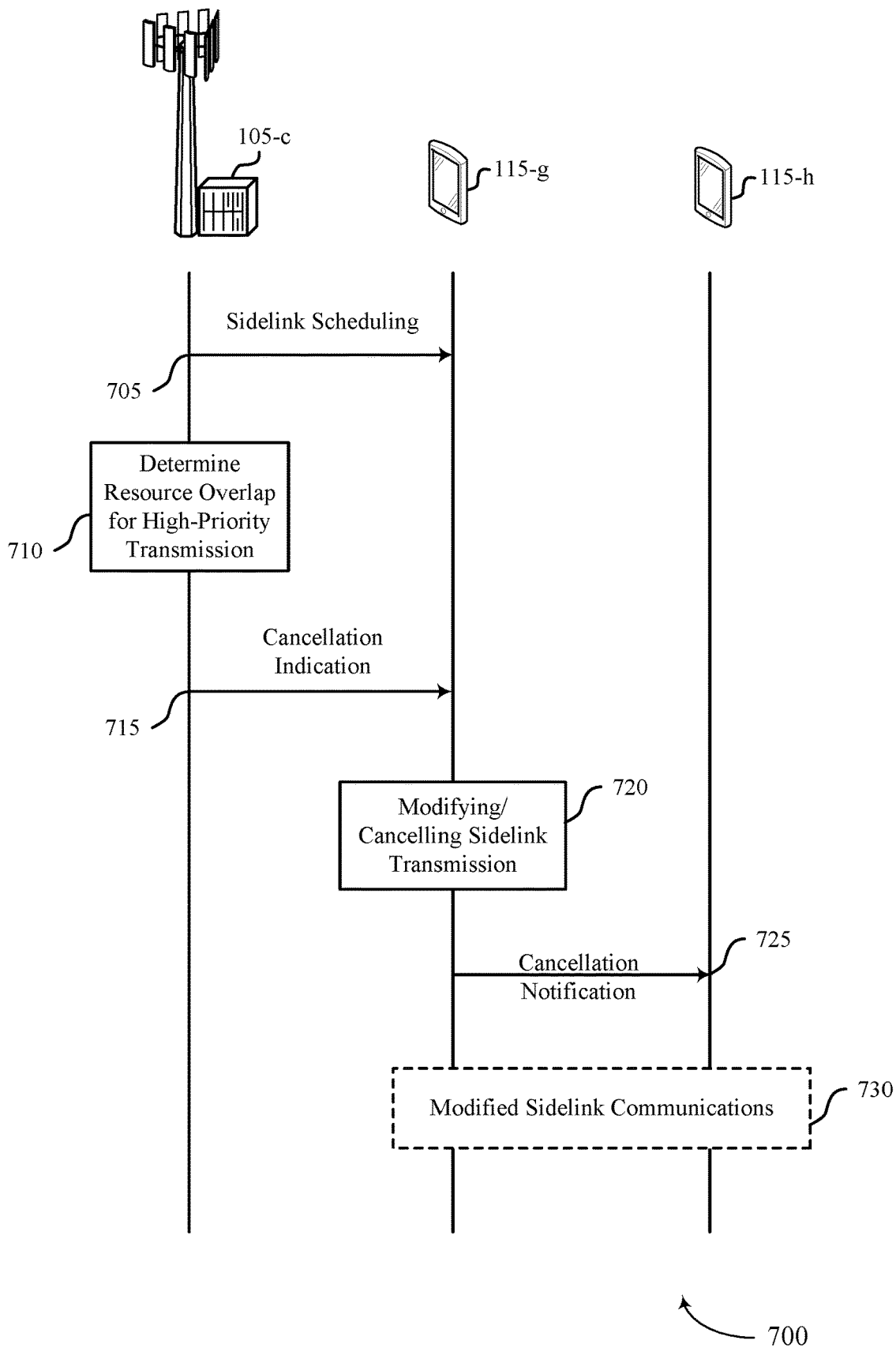
FIG. 7 illustrates an example of a process flow that supports sidelink data cancellation in accordance with aspects of the present disclosure.

FIG. 7 illustrates an example of a process flow 700 that supports sidelink data cancellation in accordance with aspects of the present disclosure. In some examples, the process flow 700 may implement aspects of a wireless communications systems 100 or 200, may implement aspects described in examples of sidelink cancellation indication configuration 300, or any combination thereof as described with reference to FIGS. 1-3. The process flow 700 may include a first UE 115-g, a second UE 115-h, and a base station 105-c which may be examples of the corresponding devices described herein. Alternative examples of the following may be implemented where some processes are performed in a different order than described or not performed at all. In some implementations, processes may include additional features not mentioned below, or further processes may be added.

At 705, the base station 105-c may transmit, and the first UE 115-g may receive, a first DCI scheduling a sidelink transmission by the first UE 115-g to the second UE 115-h on a first set of resources associated with a sidelink shared channel.

At 710, the base station 105-c may identify a high priority data (e.g., a URLLC data) for transmission on a second set of resources that at least partially overlap with the first set of resources scheduled for the sidelink transmission.

At 715, the base station 105-c may transmit, and the first UE 115-g may receive, a second DCI which includes an indication of the second set of resources that are cancelled from the first set of resources for the sidelink transmission. In some examples, the indication may be a SLCI. In some examples, the first DCI may have a first DCI format and the second DCI may have a second DCI format, and the first DCI format may be different from the second DCI format.

At 720, the first UE 115-g may modify at least a portion of the sidelink transmission based on the received second DCI. In some examples, the sidelink transmission may be a sidelink data channel transmission, a sidelink shared channel transmission, or both, and the UE may cancel the sidelink transmission on the first set of resources at least partially overlapping in frequency with the second set of resources.

In some other examples, the first UE 115-g may determine a first frequency location in which the first set of resources are overlapping with the second set of resources and a second frequency location in which the first set of resources are non-overlapping with the second set of resources. The first UE 115-g may pause the sidelink transmission on the first set of resources at the first frequency location based on the cancellation message, and may resume the sidelink transmission on the first set of resources at the second frequency location. In some cases, the first UE 115-g may transmit one or more reference signals with the sidelink transmission for estimating a phase discontinuity which may occur based on the cancellation. In some cases, the location of a DMRS may be modified (e.g., preponed or postponed) based on the pausing and resuming of the sidelink transmission.

In some examples, the first UE 115-g may apply a first RV to the sidelink transmission before the pausing of the sidelink transmission, and the UE 115-g may apply a second RV (e.g., different from the first RV) to the sidelink transmission upon resuming the sidelink transmission. Additionally or alternatively, the UE 115-g may shift a location of one or more information bits included in the sidelink transmission to a non-overlapping symbol on the first set of resources based on the redundancy version of the sidelink transmission.

In some other examples, the first UE 115-g may shift a location of one or more information bits included in the sidelink transmission to a non-overlapping symbol on the first set of resources. Based on shifting the location of the one or more information bits, the first UE 115-g may cancel the sidelink transmission on a portion of the first set of resources that is at least partially overlapping in frequency with the second set of resources.

In some cases, the UE 115-g may cancel the sidelink transmission on a portion of overlapped resources and rate match around the cancelled portion of the first set of resources. In some cases, the UE 115-g may cancel all sidelink transmissions that occur before a first DMRS on the first set of resources.

In some examples, the first UE 115-g may determine that the modified sidelink transmission overlaps with at least one DMRS scheduled on the first set of resources, and the first UE 115-g may cancel the sidelink transmission including the DMRS and one or more symbols following the DMRS. In some cases, the first UE 115-g may cancel the sidelink transmission based on a number of symbols associated with the DMRS, a channel fading rate, or both. In some cases, the first UE 115-g may modify a transmission location of the DMRS on the first set of resources based on the cancellation.

In some examples, the first UE 115-g may cancel the sidelink transmission including the DMRS and one or more symbols following the DMRS (e.g., the first UE 115-g may identify symbols following the canceled DMRS in which the channel estimation may be inaccurate, and the first UE 115-g may cancel the sidelink transmissions on those symbols). In some cases, the first UE 115-g may prepone or postpone the transmission of the DMRS based on the overlap and the cancellation. For example, the location of the DMRS on the sidelink channel may be switched with one or more non-overlapping data symbols (e.g., occurring before or after the DMRS), and the cancellation may occur for the switched data symbol.

In some examples, the first UE 115-g may determine a channel coherence time of an uplink channel associated with the first set of resources and the second set of resources, and the first UE 115-g may cancel the sidelink transmission on the first set of resources based on the channel coherence time. In some other examples, the UE 115-g may cancel all transmissions on the first set of resources based on the determined overlap.

At 725, the first UE 115-g may optionally transmit a cancellation notification to the second UE 115-h, and at 730 the first UE 115-g and the second UE 115-h may communicate using the sidelink control channel in accordance with the cancellation or modification of the sidelink transmission.

Figure 8:
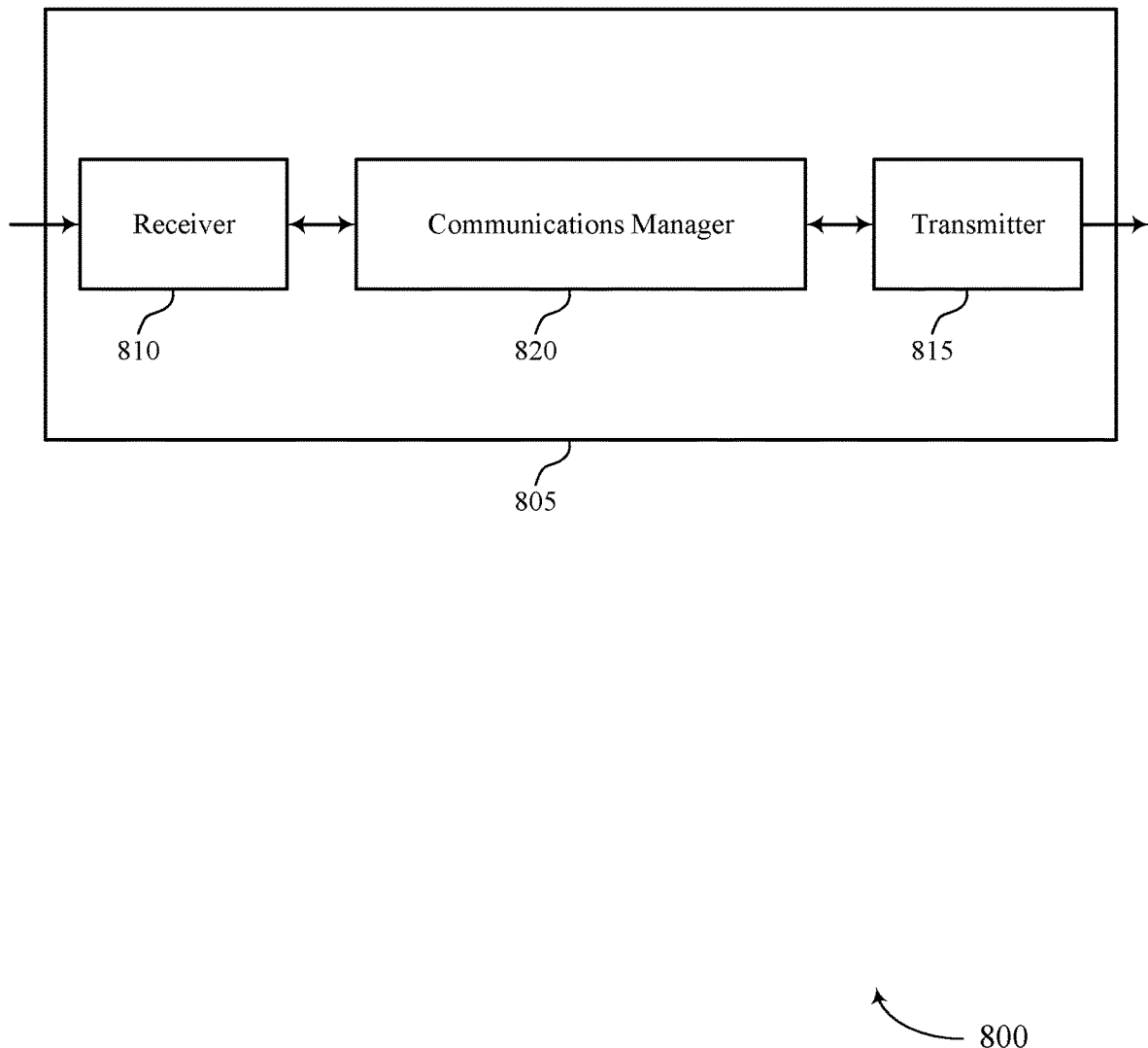
FIGS. 8 and 9 show block diagrams of devices that support sidelink data cancellation in accordance with aspects of the present disclosure.

FIG. 8 shows a block diagram 800 of a device 805 that supports sidelink data cancellation in accordance with aspects of the present disclosure. The device 805 may be an example of aspects of a UE 115 as described herein. The device 805 may include a receiver 810, a transmitter 815, and a communications manager 820. The device 805 may also include at least one processor. Each of these components may be in communication with one another (e.g., via one or more buses).

The receiver 810 may provide a means for receiving information such as packets, user data, control information, or any combination thereof associated with various information channels (e.g., control channels, data channels, information channels related to cancellation of a sidelink data channel). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to cancellation of a sidelink data channel). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of cancellation of a sidelink data channel as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include at least one processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the memory).

Additionally or alternatively, in some examples, the communications manager 820, the receiver 810, the transmitter 815, or various combinations or components thereof may be implemented in code (e.g., as communications management software) executed by at least one processor. If implemented in code executed by at least one processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first UE in accordance with examples as disclosed herein. For example, the communications manager 820 may be configured as or otherwise support a means for receiving, from a base station, a first DCI scheduling a sidelink transmission by the first UE to a second UE on a first set of resources associated with a sidelink shared channel. The communications manager 820 may be configured as or otherwise support a means for receiving, from the base station, a second DCI including an indication of a second set of resources that are cancelled from the first set of resources for the sidelink transmission. The communications manager 820 may be configured as or otherwise support a means for modifying at least a portion of the sidelink transmission based on the received second DCI. The communications manager 820 may be configured as or otherwise support a means for transmitting the modified sidelink transmission over a portion of the first set of resources in accordance with the first DCI and the second downlink control information.

By including or configuring the communications manager 820 in accordance with examples as described herein, the device 805 (e.g., at least one processor controlling or otherwise coupled to the receiver 810, the transmitter 815, the communications manager 820, or a combination thereof) may support techniques for improving the reliability of communications by mitigating or reducing interference between access links and sidelinks using sidelink cancellation indication signaling.

Figure 9:
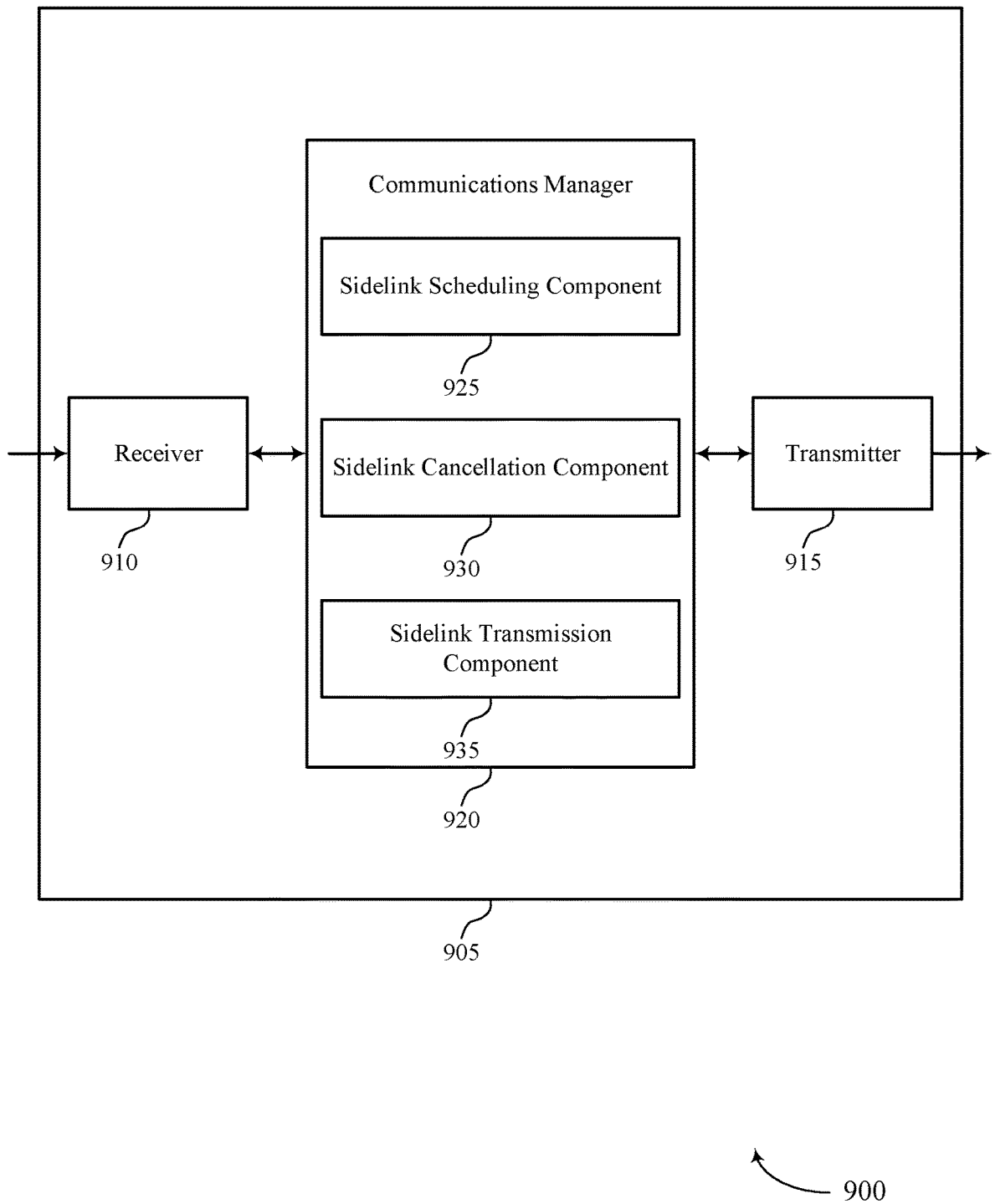

FIG. 9 shows a block diagram 900 of a device 905 that supports sidelink data cancellation in accordance with aspects of the present disclosure. The device 905 may be an example of aspects of a device 805 or a UE 115 as described herein. The device 905 may include a receiver 910, a transmitter 915, and a communications manager 920. The device 905 may also include at least one processor. Each of these components may be in communication with one another (e.g., via one or more buses).

The receiver 910 may provide a means for receiving information such as packets, user data, control information, or any combination thereof associated with various information channels (e.g., control channels, data channels, information channels related to cancellation of a sidelink data channel). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to cancellation of a sidelink data channel). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of cancellation of a sidelink data channel as described herein. For example, the communications manager 920 may include a sidelink scheduling component 925, a sidelink cancellation component 930, a sidelink transmission component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a first UE in accordance with examples as disclosed herein. The sidelink scheduling component 925 may be configured as or otherwise support a means for receiving, from a base station, a first downlink control information scheduling a sidelink transmission by the first UE to a second UE on a first set of resources associated with a sidelink shared channel. The sidelink cancellation component 930 may be configured as or otherwise support a means for receiving, from the base station, a second downlink control information including an indication of a second set of resources that are cancelled from the first set of resources for the sidelink transmission. The sidelink scheduling component 925 may be configured as or otherwise support a means for modifying at least a portion of the sidelink transmission based on the received second DCI. The sidelink transmission component 935 may be configured as or otherwise support a means for transmitting the modified sidelink transmission over a portion of the first set of resources in accordance with the first downlink control information and the second downlink control information.

Figure 10:
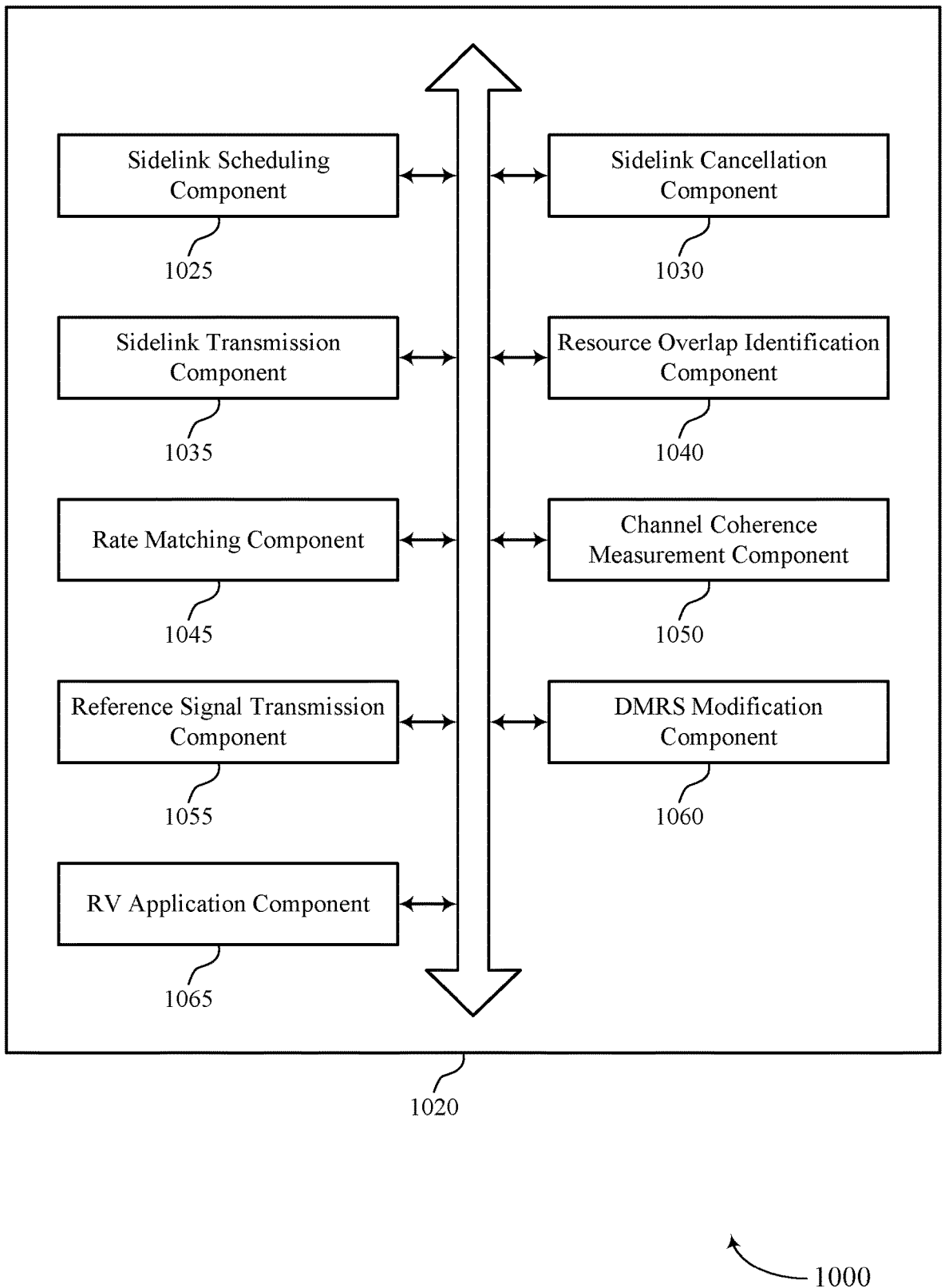
FIG. 10 shows a block diagram of a communications manager that supports sidelink data cancellation in accordance with aspects of the present disclosure.

FIG. 10 shows a block diagram 1000 of a communications manager 1020 that supports sidelink data cancellation in accordance with aspects of the present disclosure. The communications manager 1020 may be an example of aspects of a communications manager 820, a communications manager 920, or both, as described herein. The communications manager 1020, or various components thereof, may be an example of means for performing various aspects of cancellation of a sidelink data channel as described herein. For example, the communications manager 1020 may include a sidelink scheduling component 1025, a sidelink cancellation component 1030, a sidelink transmission component 1035, a resource overlap identification component 1040, a rate matching component 1045, a channel coherence measurement component 1050, a reference signal transmission component 1055, a DMRS modification component 1060, an RV application component 1065, or any combination thereof. Each of these components may communicate, directly or indirectly, with one another (e.g., via one or more buses).

The communications manager 1020 may support wireless communications at a first UE in accordance with examples as disclosed herein. The sidelink scheduling component 1025 may be configured as or otherwise support a means for receiving, from a base station, a first downlink control information scheduling a sidelink transmission by the first UE to a second UE on a first set of resources associated with a sidelink shared channel. The sidelink cancellation component 1030 may be configured as or otherwise support a means for receiving, from the base station, a second downlink control information including an indication of a second set of resources that are cancelled from the first set of resources for the sidelink transmission. In some examples, the sidelink scheduling component 1025 may be configured as or otherwise support a means for modifying at least a portion of the sidelink transmission based on the received second DCI. The sidelink transmission component 1035 may be configured as or otherwise support a means for transmitting the modified sidelink transmission over a portion of the first set of resources in accordance with the first downlink control information and the second downlink control information.

In some examples, to support modifying at least a portion of the sidelink transmission, where the sidelink transmission is a sidelink data transmission, the sidelink cancellation component 1030 may be configured as or otherwise support a means for cancelling the sidelink transmission on the first set of resources based on the first set of resources at least partially overlapping in frequency with the second set of resources.

In some examples, to support modifying at least a portion of the sidelink transmission, where the sidelink transmission is a sidelink data transmission, the resource overlap identification component 1040 may be configured as or otherwise support a means for determining a first frequency location in which the first set of resources are overlapping with the second set of resources and a second frequency location in which the first set of resources are non-overlapping with the second set of resources. In some examples, to support modifying at least a portion of the sidelink transmission, where the sidelink transmission is a sidelink data transmission, the sidelink scheduling component 1025 may be configured as or otherwise support a means for pausing the sidelink transmission on the first set of resources at the first frequency location based on the cancellation message. In some examples, to support modifying at least a portion of the sidelink transmission, where the sidelink transmission is a sidelink control transmission, the sidelink transmission component 1035 may be configured as or otherwise support a means for performing the sidelink transmission on the first set of resources at the second frequency location.

In some examples, to support performing the sidelink transmission on the first set of resources at the second frequency location, the reference signal transmission component 1055 may be configured as or otherwise support a means for transmitting one or more reference signals with the sidelink transmission, where the one or more reference signals are for estimating a phase discontinuity based on the modifying at least a portion of the sidelink transmission.

In some examples, to support modifying at least a portion of the sidelink transmission, where the sidelink transmission is a sidelink control transmission, the sidelink scheduling component 1025 may be configured as or otherwise support a means for shifting a location of one or more information bits included in the sidelink transmission to a non-overlapping symbol on the first set of resources. In some examples, to support modifying at least a portion of the sidelink transmission, where the sidelink transmission is a sidelink control transmission, the sidelink cancellation component 1030 may be configured as or otherwise support a means for cancelling the sidelink transmission on a portion of the first set of resources that is at least partially overlapping in frequency with the second set of resources.

In some examples, to support modifying at least a portion of the sidelink transmission, where the sidelink transmission is a sidelink control transmission, the sidelink cancellation component 1030 may be configured as or otherwise support a means for cancelling the sidelink transmission on a portion of the first set of resources that are at least partially overlapping in frequency with the second set of resources. In some examples, to support modifying at least a portion of the sidelink transmission, where the sidelink transmission is a sidelink control transmission, the rate matching component 1045 may be configured as or otherwise support a means for rate matching around the cancelled portion of the first set of resources.

In some examples, to support modifying at least a portion of the sidelink transmission, where the sidelink transmission is a sidelink control transmission, the sidelink cancellation component 1030 may be configured as or otherwise support a means for cancelling the sidelink transmission on a portion of the first set of resources that is at least partially overlapping in frequency with the second set of resources, where the sidelink transmission includes one or more sidelink transmissions of a sidelink data channel, a sidelink shared channel, or both.

In some examples, the sidelink cancellation component 1030 may be configured as or otherwise support a means for cancelling the sidelink transmission including a sidelink data channel transmission, a sidelink shared channel transmission, or both, that is scheduled to occur before transmission of a DMRS on the first set of resources.

In some examples, to support modifying at least a portion of the sidelink transmission, where the sidelink transmission is a sidelink control transmission, the resource overlap identification component 1040 may be configured as or otherwise support a means for determining that the modified sidelink transmission overlaps with a DMRS scheduled on the first set of resources. In some examples, to support modifying at least a portion of the sidelink transmission, where the sidelink transmission is a sidelink control transmission, the sidelink cancellation component 1030 may be configured as or otherwise support a means for cancelling the sidelink transmission including the DMRS and one or more symbols following the DMRS, where the DMRS is for performing channel estimation of the one or more symbols.

In some examples, the sidelink cancellation component 1030 may be configured as or otherwise support a means for cancelling the sidelink transmission based on a number of symbols associated with the DMRS, a channel fading rate, or both.

In some examples, the DMRS modification component 1060 may be configured as or otherwise support a means for modifying a transmission location of the DMRS on the first set of resources based on the cancelling of the sidelink transmission.

In some examples, to support modifying at least a portion of the sidelink transmission, where the sidelink transmission is a sidelink control transmission, the sidelink cancellation component 1030 may be configured as or otherwise support a means for cancelling the sidelink transmission on the first set of resources based on the first set of resources at least partially overlapping in frequency with the second set of resources.

In some examples, to support modifying at least a portion of the sidelink transmission, where the sidelink transmission is a sidelink control transmission, the channel coherence measurement component 1050 may be configured as or otherwise support a means for determining a channel coherence time of an uplink channel associated with the first set of resources and the second set of resources. In some examples, to support modifying at least a portion of the sidelink transmission, where the sidelink transmission is a sidelink control transmission, the sidelink cancellation component 1030 may be configured as or otherwise support a means for cancelling the sidelink transmission on the first set of resources based on the channel coherence time.

In some examples, to support modifying at least a portion of the sidelink transmission, where the sidelink transmission is a sidelink control transmission, the resource overlap identification component 1040 may be configured as or otherwise support a means for determining a first frequency location in which the first set of resources are overlapping with the second set of resources and a second frequency location in which the first set of resources are non-overlapping with the second set of resources. In some examples, to support modifying at least a portion of the sidelink transmission, where the sidelink transmission is a sidelink control transmission, the sidelink transmission component 1035 may be configured as or otherwise support a means for pausing the sidelink transmission on the first set of resources at the first frequency location based on the received second DCI. In some examples, to support modifying at least a portion of the sidelink transmission, where the sidelink transmission is a sidelink control transmission, the sidelink transmission component 1035 may be configured as or otherwise support a means for resuming the sidelink transmission on the first set of resources at the second frequency location.

In some examples, the sidelink scheduling component 1025 may be configured as or otherwise support a means for modifying a location of transmission of a DMRS on the first set of resources based on the pausing and resuming of the sidelink shared channel transmission.

In some examples, the modifying the location of transmission includes preponing or postponing transmission of the DMRS based on the cancellation.

In some examples, the RV application component 1065 may be configured as or otherwise support a means for applying a first redundancy version to the sidelink transmission before the pausing of the sidelink transmission, and a second redundancy version to the sidelink transmission upon resuming the sidelink transmission, where the first redundancy version is different from the second redundancy version.

In some examples, to support modifying at least a portion of the sidelink transmission, where the sidelink transmission is a sidelink control transmission, the sidelink scheduling component 1025 may be configured as or otherwise support a means for shifting a location of one or more information bits included in the sidelink shared channel transmission to a non-overlapping symbol on the first set of resources based on a redundancy version of the sidelink transmission. In some examples, to support modifying at least a portion of the sidelink transmission, where the sidelink transmission is a sidelink control transmission, the sidelink cancellation component 1030 may be configured as or otherwise support a means for cancelling the sidelink transmission on the first set of resources that are at least partially overlapping in frequency with the second set of resources.

In some examples, to support modifying at least a portion of the sidelink transmission, where the sidelink transmission is a sidelink control transmission, the resource overlap identification component 1040 may be configured as or otherwise support a means for determining that the sidelink transmission overlaps with a DMRS scheduled on the first set of resources. In some examples, to support modifying at least a portion of the sidelink transmission, where the sidelink transmission is a sidelink control transmission, the sidelink cancellation component 1030 may be configured as or otherwise support a means for cancelling the sidelink transmission including a DMRS and one or more symbols following the DMRS, where the DMRS is for channel estimation of the one or more symbols.

In some examples, the sidelink cancellation component 1030 may be configured as or otherwise support a means for cancelling the sidelink transmission based on a channel coherence time associated with the first set of resources and the second set of resources.

In some examples, the sidelink cancellation component 1030 may be configured as or otherwise support a means for cancelling the sidelink shared channel transmission including the DMRS and at least a portion of a DMRS repetition in a previous or subsequent non-overlapping symbol. In some examples, the sidelink transmission component 1035 may be configured as or otherwise support a means for modifying a transmission location of the DMRS on the first set of resources based on the cancelling of the sidelink transmission.

In some examples, the modifying includes preponing or postponing transmission of the DMRS based on the cancellation.

In some examples, to support modifying at least a portion of the sidelink transmission, where the sidelink transmission is a sidelink control transmission, the resource overlap identification component 1040 may be configured as or otherwise support a means for determining that the sidelink transmission overlaps with a DMRS scheduled on the first set of resources. In some examples, to support modifying at least a portion of the sidelink transmission, where the sidelink transmission is a sidelink control transmission, the sidelink transmission component 1035 may be configured as or otherwise support a means for switching a location of a DMRS with a non-overlapping data symbol. In some examples, to support modifying at least a portion of the sidelink transmission, where the sidelink transmission is a sidelink control transmission, the sidelink cancellation component 1030 may be configured as or otherwise support a means for cancelling the non-overlapping data symbol based on the switching. In some examples, the non-overlapping data symbol occurs prior to the DMRS. In some examples, the non-overlapping data symbol occurs after the DMRS.

In some examples, to support modifying at least a portion of the sidelink transmission, where the sidelink transmission is a sidelink control transmission, the resource overlap identification component 1040 may be configured as or otherwise support a means for determining that the sidelink transmission overlaps with a first DMRS scheduled on the first set of resources. In some examples, to support modifying at least a portion of the sidelink transmission, where the sidelink transmission is a sidelink control transmission, the sidelink cancellation component 1030 may be configured as or otherwise support a means for cancelling all transmissions on the first set of resources based on the overlap with the first DMRS.

In some examples, the first DCI includes a first format of DCI for scheduling sidelink communications and the second DCI includes a second format of DCI for cancelling sidelink communications.

Figure 11:
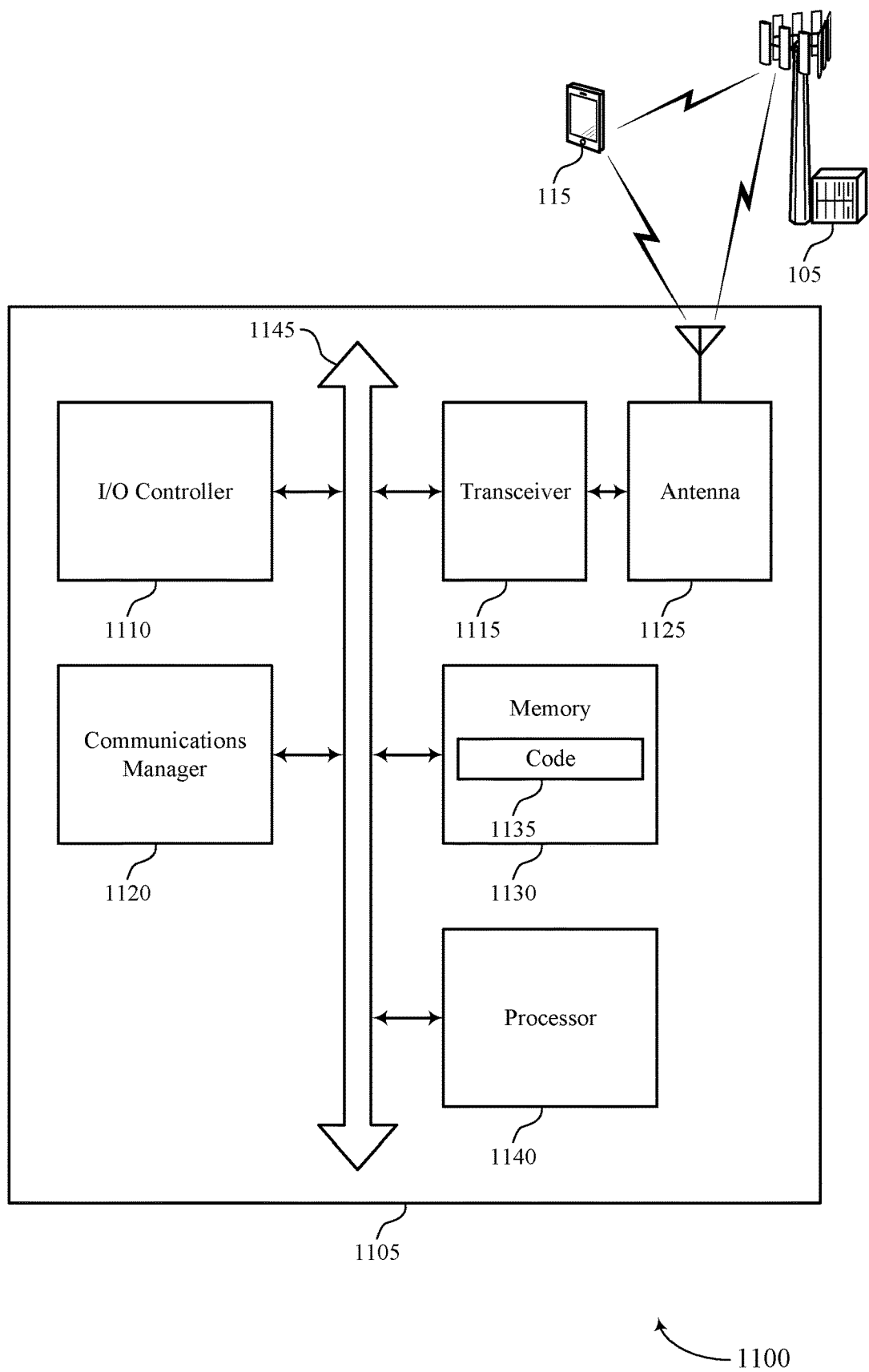
FIG. 11 shows a diagram of a system including a device that supports sidelink data cancellation in accordance with aspects of the present disclosure.

FIG. 11 shows a diagram of a system 1100 including a device 1105 that supports sidelink control cancellation in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and at least one processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of at least one processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting cancellation of sidelink data channel). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a first UE in accordance with examples as disclosed herein. For example, the communications manager 1120 may be configured as or otherwise support a means for receiving, from a base station, a first DCI scheduling a sidelink transmission by the first UE to a second UE on a first set of resources associated with a sidelink shared channel. The communications manager 1120 may be configured as or otherwise support a means for receiving, from the base station, a second DCI including an indication of a second set of resources that are cancelled from the first set of resources for the sidelink transmission. The communications manager 1120 may be configured as or otherwise support a means for modifying at least a portion of the sidelink transmission based on the received second DCI. The communications manager 1120 may be configured as or otherwise support a means for transmitting the modified sidelink transmission over a portion of the first set of resources in accordance with the first DCI and the second DCI.

By including or configuring the communications manager 1120 in accordance with examples as described herein, the device 1105 may support techniques for improved communication reliability for low latency and high priority transmissions, reduced latency, reduced power consumption, more efficient utilization of communication resources, improved coordination between devices, and longer battery life.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of cancellation of sidelink data channel as described herein, or the processor 1140 and the memory 1130 may be otherwise configured to perform or support such operations.

Figure 12:
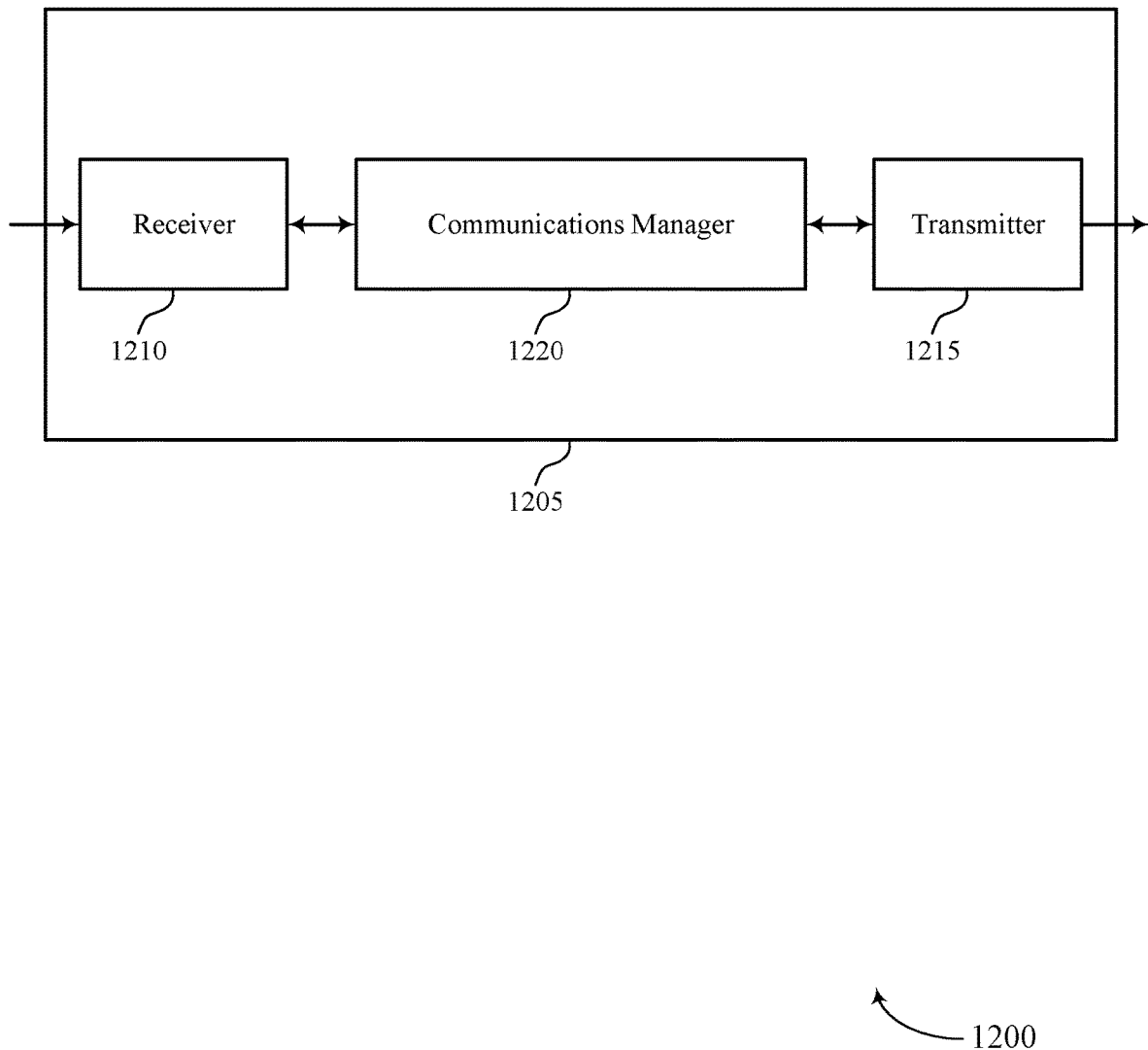
FIGS. 12 and 13 show block diagrams of devices that support sidelink data cancellation in accordance with aspects of the present disclosure.

FIG. 12 shows a block diagram 1200 of a device 1205 that supports sidelink data cancellation in accordance with aspects of the present disclosure. The device 1205 may be an example of aspects of a base station 105 as described herein. The device 1205 may include a receiver 1210, a transmitter 1215, and a communications manager 1220. The device 1205 may also include at least one processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to cancellation of sidelink data channel). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to cancellation of sidelink data channel). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of cancellation of sidelink data channel as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include at least one processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software) executed by at least one processor. If implemented in code executed by at least one processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. For example, the communications manager 1220 may be configured as or otherwise support a means for transmitting, to a first UE, a first DCI scheduling a sidelink transmission by the first UE to a second UE on a first set of resources associated with a sidelink shared channel. The communications manager 1220 may be configured as or otherwise support a means for transmitting, to the first UE, a second DCI including an indication of a second set of resources that are cancelled from the first set of resources for the sidelink transmission. The communications manager 1220 may be configured as or otherwise support a means for receiving, from the first UE, a modified transmission over a portion of the first set of resources in accordance with the first DCI and the second DCI.

By including or configuring the communications manager 1220 in accordance with examples as described herein, the device 1205 (e.g., at least one processor controlling or otherwise coupled to the receiver 1210, the transmitter 1215, the communications manager 1220, or a combination thereof) may support techniques for improving a reliability of communications by mitigating or reducing interference between access links and sidelinks using sidelink cancellation indication signaling.

Figure 13:
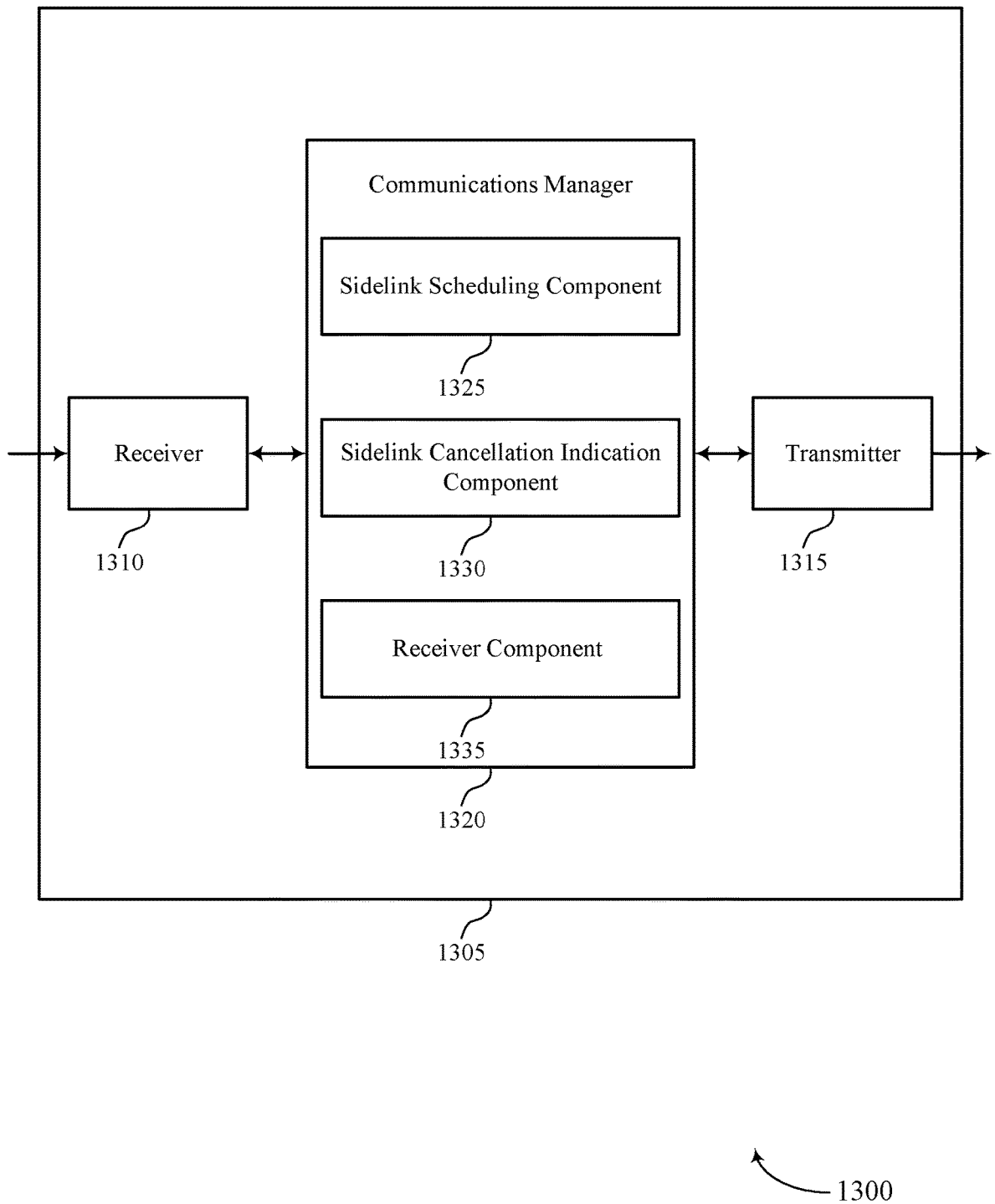

FIG. 13 shows a block diagram 1300 of a device 1305 that supports sidelink data cancellation in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include at least one processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to cancellation of sidelink data channel). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to cancellation of sidelink data channel). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of cancellation of sidelink data channel as described herein. For example, the communications manager 1320 may include a sidelink scheduling component 1325, a sidelink cancellation indication component 1330, a receiver component 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. The sidelink scheduling component 1325 may be configured as or otherwise support a means for transmitting, to a first UE, a first DCI scheduling a sidelink transmission by the first UE to a second UE on a first set of resources associated with a sidelink shared channel. The sidelink cancellation indication component 1330 may be configured as or otherwise support a means for transmitting, to the first UE, a second DCI including an indication of a second set of resources that are cancelled from the first set of resources for the sidelink transmission. The receiver component 1335 may be configured as or otherwise support a means for receiving, from the first UE, a modified transmission over a portion of the first set of resources in accordance with the first DCI and the second DCI.

Figure 14:
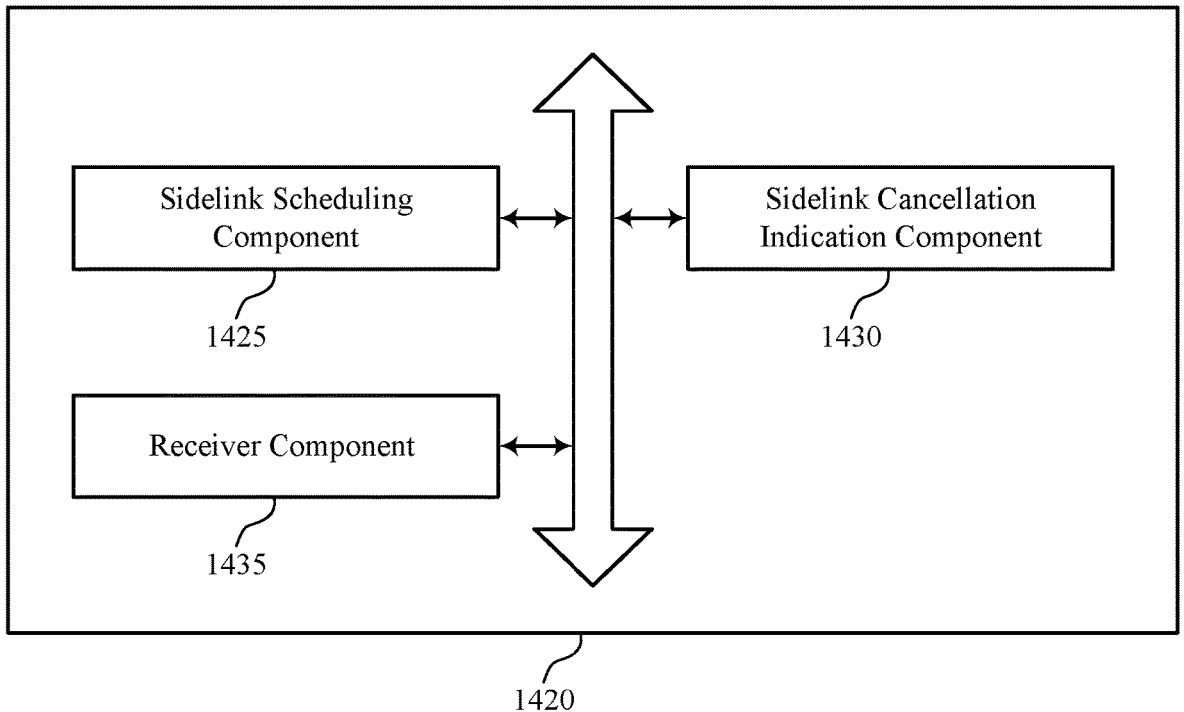
FIG. 14 shows a block diagram of a communications manager that supports sidelink data cancellation in accordance with aspects of the present disclosure.

FIG. 14 shows a block diagram 1400 of a communications manager 1420 that supports sidelink data cancellation in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of cancellation of sidelink data channel as described herein. For example, the communications manager 1420 may include a sidelink scheduling component 1425, a sidelink cancellation indication component 1430, a receiver component 1435, or any combination thereof. Each of these components may communicate, directly or indirectly, with one another (e.g., via one or more buses).

The communications manager 1420 may support wireless communications at a base station in accordance with examples as disclosed herein. The sidelink scheduling component 1425 may be configured as or otherwise support a means for transmitting, to a first UE, a first DCI scheduling a sidelink transmission by the first UE to a second UE on a first set of resources associated with a sidelink shared channel. The sidelink cancellation indication component 1430 may be configured as or otherwise support a means for transmitting, to the first UE, a second DCI including an indication of a second set of resources that are cancelled from the first set of resources for the sidelink transmission. The receiver component 1435 may be configured as or otherwise support a means for receiving, from the first UE, a modified transmission over a portion of the first set of resources in accordance with the first DCI and the second DCI.

Figure 15:
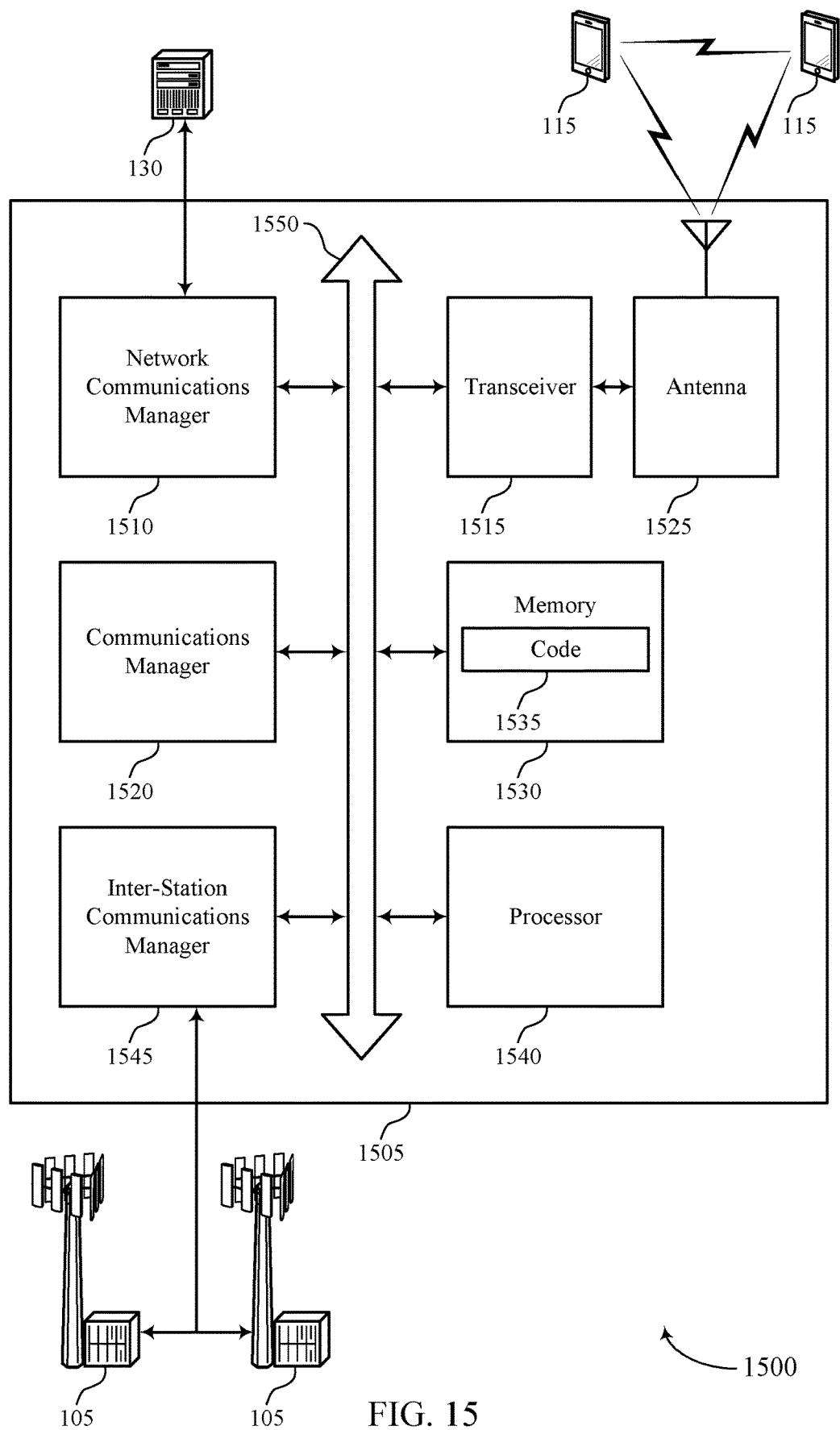
FIG. 15 shows a diagram of a system including a device that supports sidelink data cancellation in accordance with aspects of the present disclosure.

FIG. 15 shows a diagram of a system 1500 including a device 1505 that supports sidelink data cancellation in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, at least one processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting cancellation of sidelink data channel). For example, the device 1505 or a component of the device 1505 may include at least one processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communications at a base station in accordance with examples as disclosed herein. For example, the communications manager 1520 may be configured as or otherwise support a means for transmitting, to a first UE, a first DCI scheduling a sidelink transmission by the first UE to a second UE on a first set of resources associated with a sidelink shared channel. The communications manager 1520 may be configured as or otherwise support a means for transmitting, to the first UE, a second DCI including an indication of a second set of resources that are cancelled from the first set of resources for the sidelink transmission. The communications manager 1520 may be configured as or otherwise support a means for receiving, from the first UE, a modified transmission over a portion of the first set of resources in accordance with the first DCI and the second DCI.

By including or configuring the communications manager 1520 in accordance with examples as described herein, the device 1505 may support techniques for improved communication reliability for low latency and high priority transmissions, reduced latency, reduced power consumption, more efficient utilization of communication resources, improved coordination between devices, and longer battery life.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of cancellation of sidelink data channel as described herein, or the processor 1540 and the memory 1530 may be otherwise configured to perform or support such operations.

Figure 16:
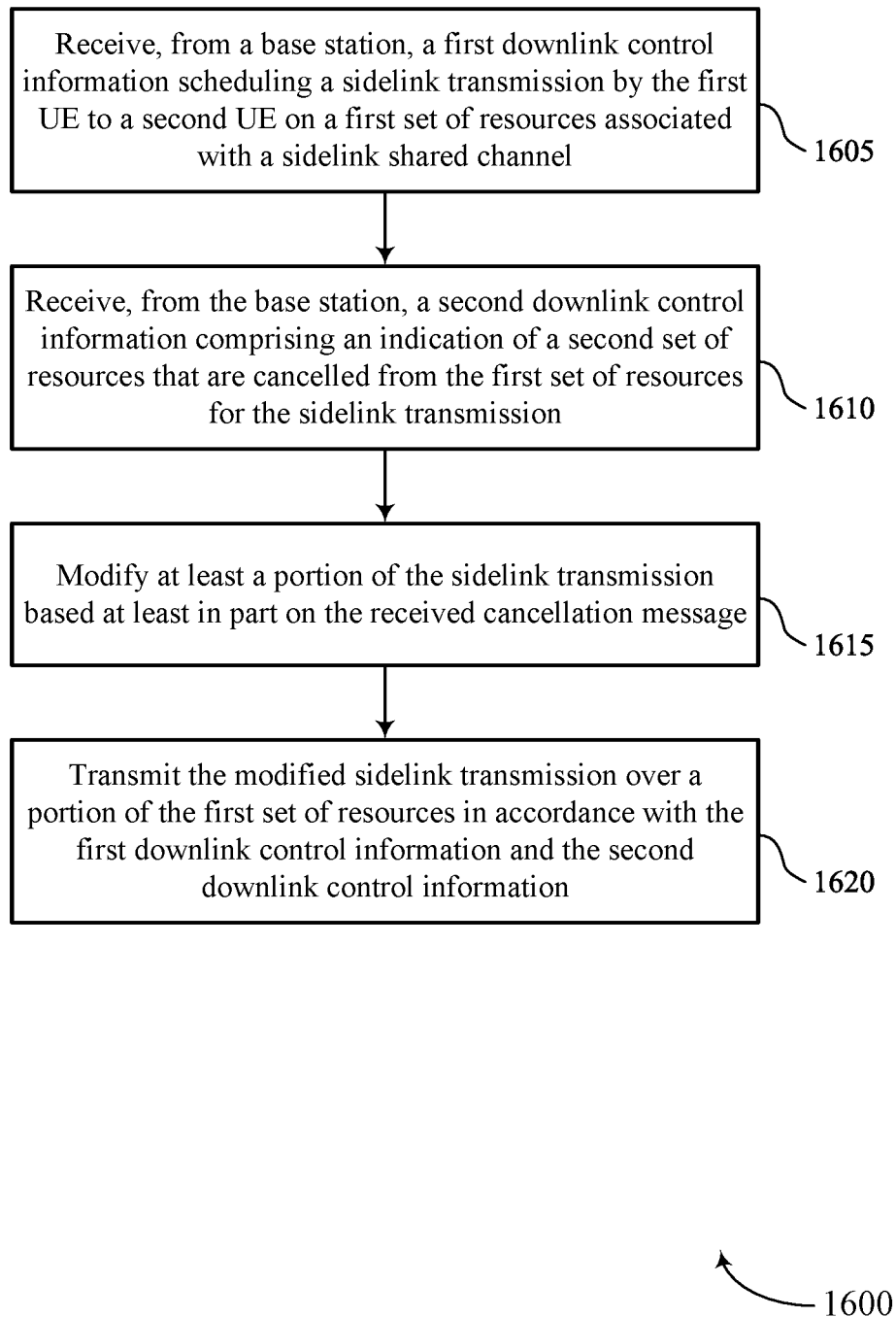
FIGS. 16 through 23 show flowcharts illustrating methods that support sidelink data cancellation in accordance with aspects of the present disclosure.

FIG. 16 shows a flowchart illustrating a method 1600 that supports sidelink data cancellation in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a first DCI scheduling a sidelink transmission by the first UE to a second UE on a first set of resources associated with a sidelink shared channel. The operations of 1605 may be performed in accordance with examples as disclosed herein. In some examples, aspects of the operations of 1605 may be performed by a sidelink scheduling component 1025 as described with reference to FIG. 10.

At 1610, the method may include receiving, from the base station, a second DCI including an indication of a second set of resources that are cancelled from the first set of resources for the sidelink transmission. The operations of 1610 may be performed in accordance with examples as disclosed herein. In some examples, aspects of the operations of 1610 may be performed by a sidelink cancellation component 1030 as described with reference to FIG. 10.

At 1615, the method may include modifying at least a portion of the sidelink transmission based on the received second DCI. The operations of 1615 may be performed in accordance with examples as disclosed herein. In some examples, aspects of the operations of 1615 may be performed by a sidelink scheduling component 1025 as described with reference to FIG. 10.

At 1620, the method may include transmitting the modified sidelink transmission over a portion of the first set of resources in accordance with the first DCI and the second DCI. The operations of 1620 may be performed in accordance with examples as disclosed herein. In some examples, aspects of the operations of 1620 may be performed by a sidelink transmission component 1035 as described with reference to FIG. 10.

Figure 17:
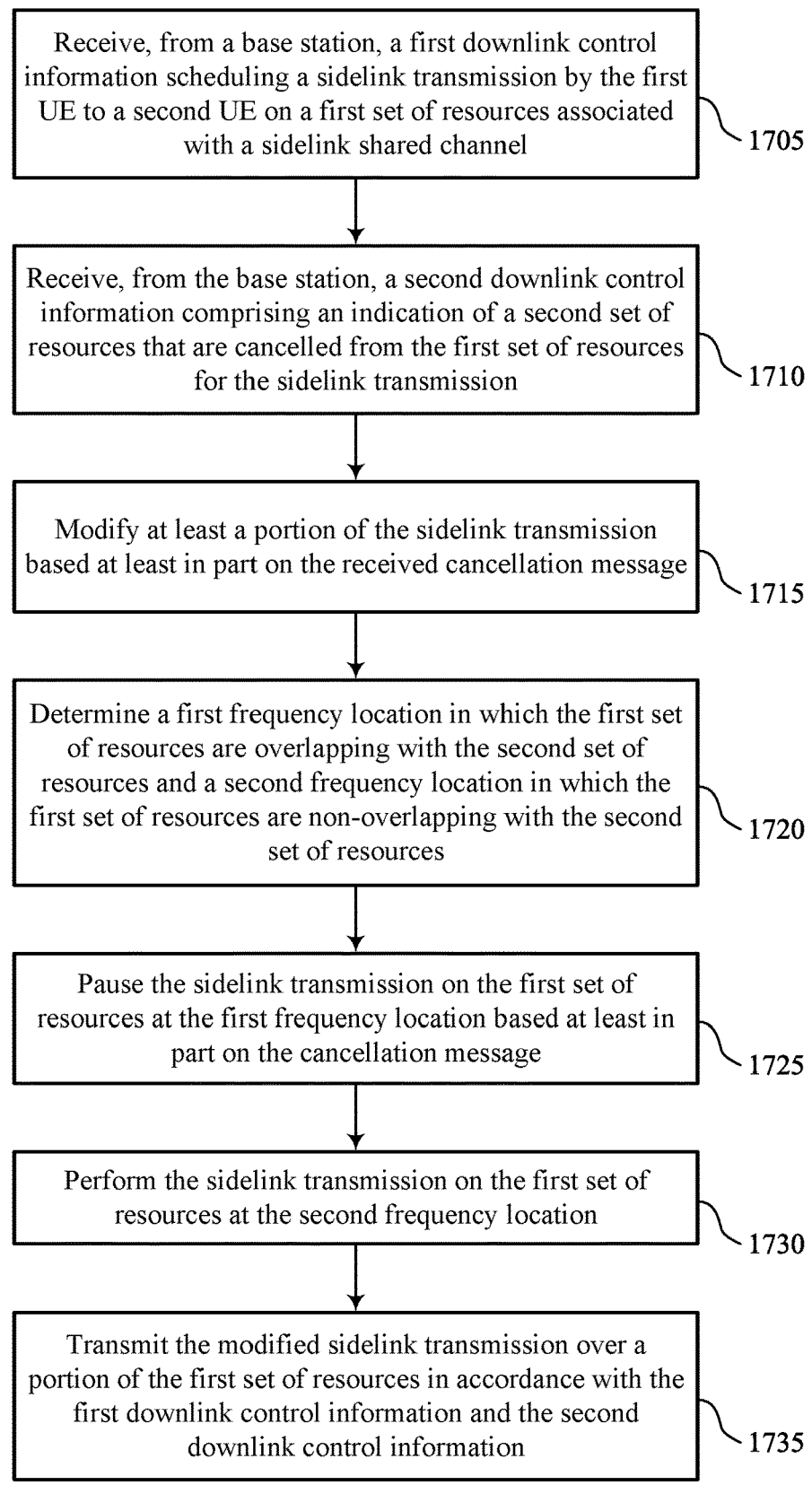

FIG. 17 shows a flowchart illustrating a method 1700 that supports sidelink data cancellation in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, a first DCI scheduling a sidelink transmission by the first UE to a second UE on a first set of resources associated with a sidelink shared channel. The operations of 1705 may be performed in accordance with examples as disclosed herein. In some examples, aspects of the operations of 1705 may be performed by a sidelink scheduling component 1025 as described with reference to FIG. 10.

At 1710, the method may include receiving, from the base station, a second DCI including an indication of a second set of resources that are cancelled from the first set of resources for the sidelink transmission. The operations of 1710 may be performed in accordance with examples as disclosed herein. In some examples, aspects of the operations of 1710 may be performed by a sidelink cancellation component 1030 as described with reference to FIG. 10.

At 1715, the method may include modifying at least a portion of the sidelink transmission based on the received second DCI. The operations of 1715 may be performed in accordance with examples as disclosed herein. In some examples, aspects of the operations of 1715 may be performed by a sidelink scheduling component 1025 as described with reference to FIG. 10.

At 1720, the method may include determining a first frequency location in which the first set of resources are overlapping with the second set of resources and a second frequency location in which the first set of resources are non-overlapping with the second set of resources. The operations of 1720 may be performed in accordance with examples as disclosed herein. In some examples, aspects of the operations of 1720 may be performed by a resource overlap identification component 1040 as described with reference to FIG. 10.

At 1725, the method may include pausing the sidelink transmission on the first set of resources at the first frequency location based on the received second DCI. The operations of 1725 may be performed in accordance with examples as disclosed herein. In some examples, aspects of the operations of 1725 may be performed by a sidelink scheduling component 1025 as described with reference to FIG. 10.

At 1730, the method may include performing the sidelink transmission on the first set of resources at the second frequency location. The operations of 1730 may be performed in accordance with examples as disclosed herein. In some examples, aspects of the operations of 1730 may be performed by a sidelink transmission component 1035 as described with reference to FIG. 10.

At 1735, the method may include transmitting the modified sidelink transmission over a portion of the first set of resources in accordance with the first DCI and the second DCI. The operations of 1735 may be performed in accordance with examples as disclosed herein. In some examples, aspects of the operations of 1735 may be performed by a sidelink transmission component 1035 as described with reference to FIG. 10.

Figure 18:
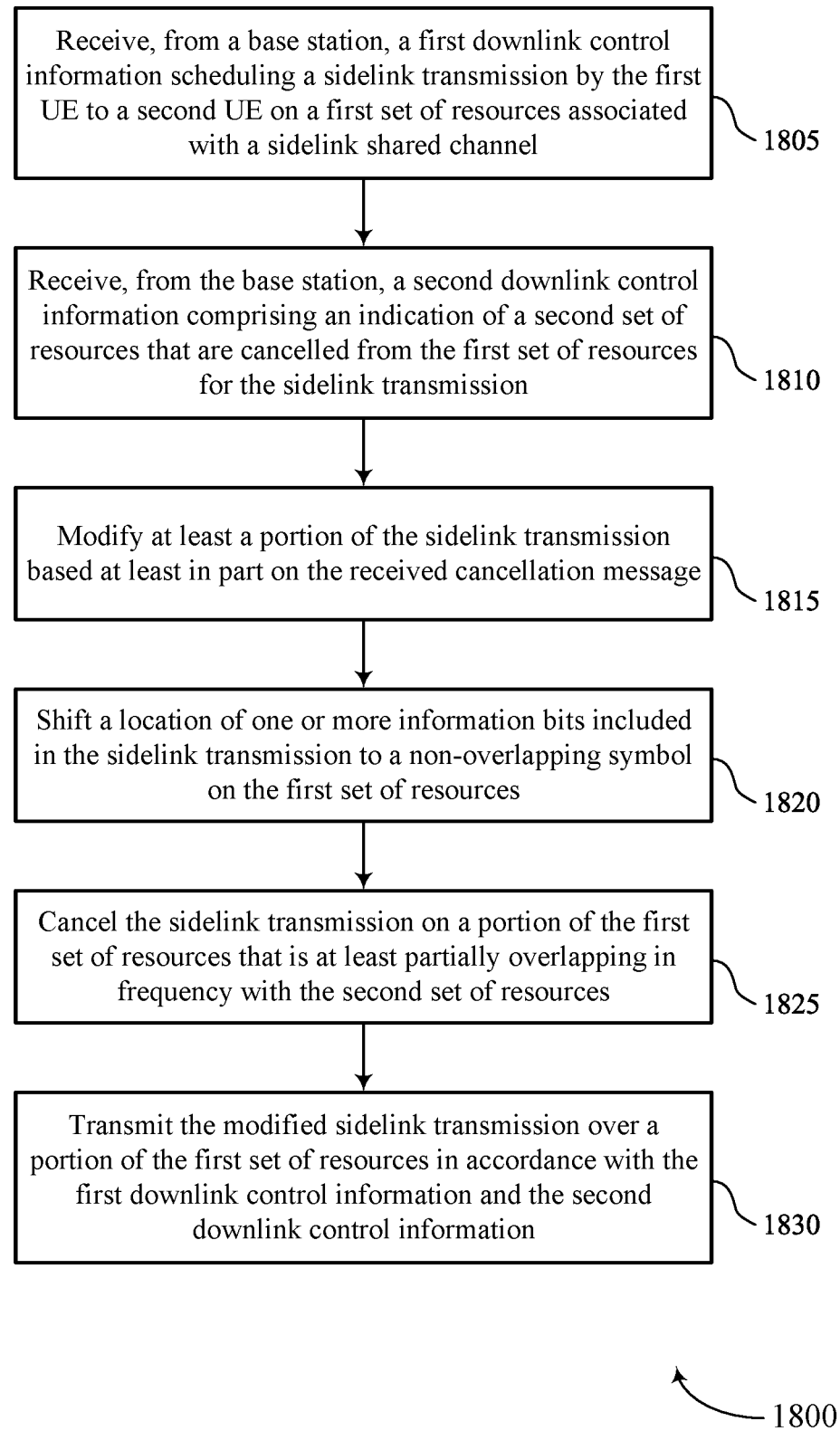

FIG. 18 shows a flowchart illustrating a method 1800 that supports sidelink data cancellation in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, a first DCI scheduling a sidelink transmission by the first UE to a second UE on a first set of resources associated with a sidelink shared channel. The operations of 1805 may be performed in accordance with examples as disclosed herein. In some examples, aspects of the operations of 1805 may be performed by a sidelink scheduling component 1025 as described with reference to FIG. 10.

At 1810, the method may include receiving, from the base station, a second DCI including an indication of a second set of resources that are cancelled from the first set of resources for the sidelink transmission. The operations of 1810 may be performed in accordance with examples as disclosed herein. In some examples, aspects of the operations of 1810 may be performed by a sidelink cancellation component 1030 as described with reference to FIG. 10.

At 1815, the method may include modifying at least a portion of the sidelink transmission based on the received second DCI. The operations of 1815 may be performed in accordance with examples as disclosed herein. In some examples, aspects of the operations of 1815 may be performed by a sidelink scheduling component 1025 as described with reference to FIG. 10.

At 1820, the method may include shifting a location of one or more information bits included in the sidelink transmission to a non-overlapping symbol on the first set of resources. The operations of 1820 may be performed in accordance with examples as disclosed herein. In some examples, aspects of the operations of 1820 may be performed by a sidelink scheduling component 1025 as described with reference to FIG. 10.

At 1825, the method may include cancelling the sidelink transmission on a portion of the first set of resources that is at least partially overlapping in frequency with the second set of resources. The operations of 1825 may be performed in accordance with examples as disclosed herein. In some examples, aspects of the operations of 1825 may be performed by a sidelink cancellation component 1030 as described with reference to FIG. 10.

At 1830, the method may include transmitting the modified sidelink transmission over a portion of the first set of resources in accordance with the first DCI and the second DCI. The operations of 1830 may be performed in accordance with examples as disclosed herein. In some examples, aspects of the operations of 1830 may be performed by a sidelink transmission component 1035 as described with reference to FIG. 10.

Figure 19:
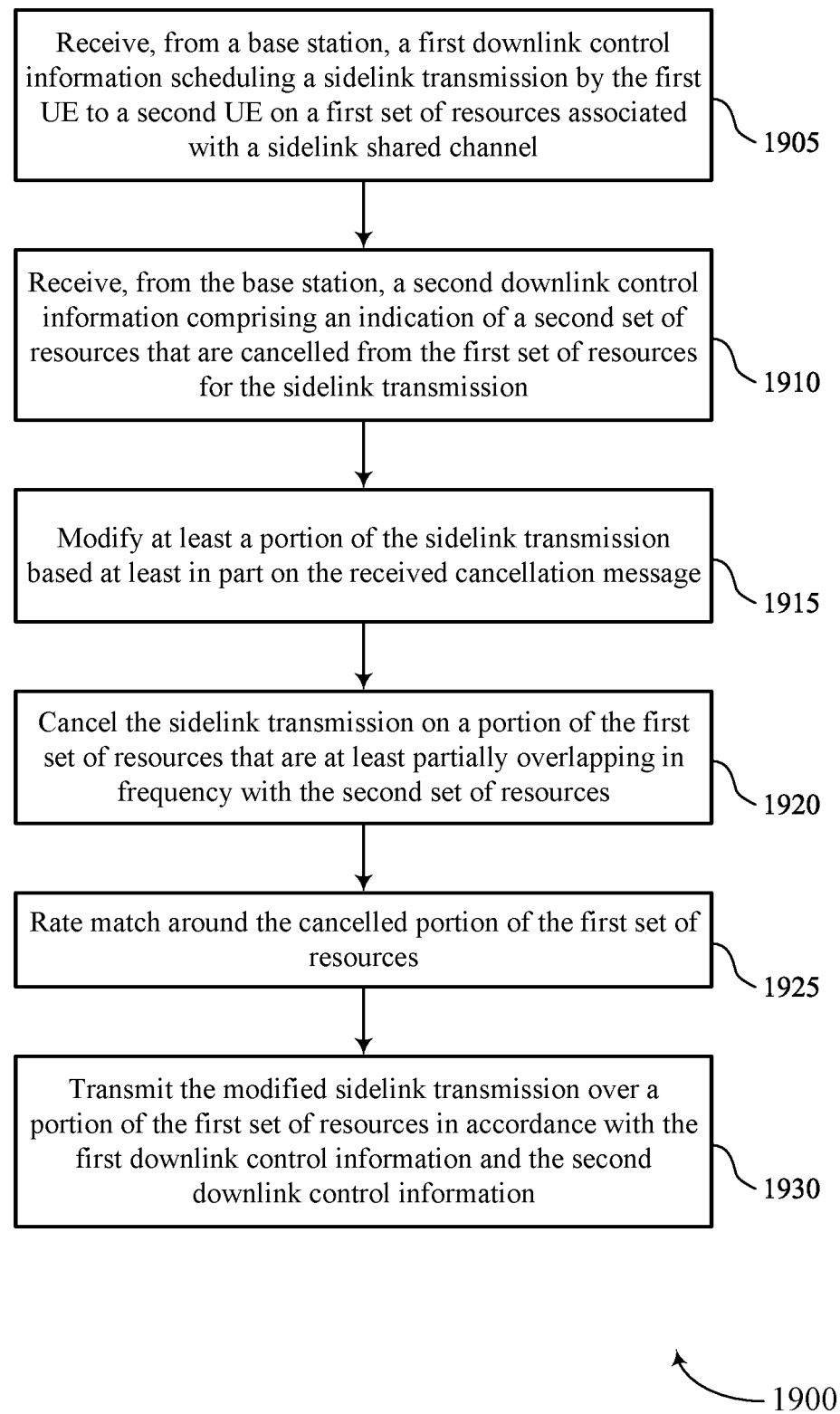

FIG. 19 shows a flowchart illustrating a method 1900 that supports sidelink data cancellation in accordance with aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, a first DCI scheduling a sidelink transmission by the first UE to a second UE on a first set of resources associated with a sidelink shared channel. The operations of 1905 may be performed in accordance with examples as disclosed herein. In some examples, aspects of the operations of 1905 may be performed by a sidelink scheduling component 1025 as described with reference to FIG. 10.

At 1910, the method may include receiving, from the base station, a second DCI including an indication of a second set of resources that are cancelled from the first set of resources for the sidelink transmission. The operations of 1910 may be performed in accordance with examples as disclosed herein. In some examples, aspects of the operations of 1910 may be performed by a sidelink cancellation component 1030 as described with reference to FIG. 10.

At 1915, the method may include modifying at least a portion of the sidelink transmission based on the received second DCI. The operations of 1915 may be performed in accordance with examples as disclosed herein. In some examples, aspects of the operations of 1915 may be performed by a sidelink scheduling component 1025 as described with reference to FIG. 10.

At 1920, the method may include cancelling the sidelink transmission on a portion of the first set of resources that are at least partially overlapping in frequency with the second set of resources. The operations of 1920 may be performed in accordance with examples as disclosed herein. In some examples, aspects of the operations of 1920 may be performed by a sidelink cancellation component 1030 as described with reference to FIG. 10.

At 1925, the method may include rate matching around the cancelled portion of the first set of resources. The operations of 1925 may be performed in accordance with examples as disclosed herein. In some examples, aspects of the operations of 1925 may be performed by a rate matching component 1045 as described with reference to FIG. 10.

At 1930, the method may include transmitting the modified sidelink transmission over a portion of the first set of resources in accordance with the first DCI and the second DCI. The operations of 1930 may be performed in accordance with examples as disclosed herein. In some examples, aspects of the operations of 1930 may be performed by a sidelink transmission component 1035 as described with reference to FIG. 10.

Figure 20:
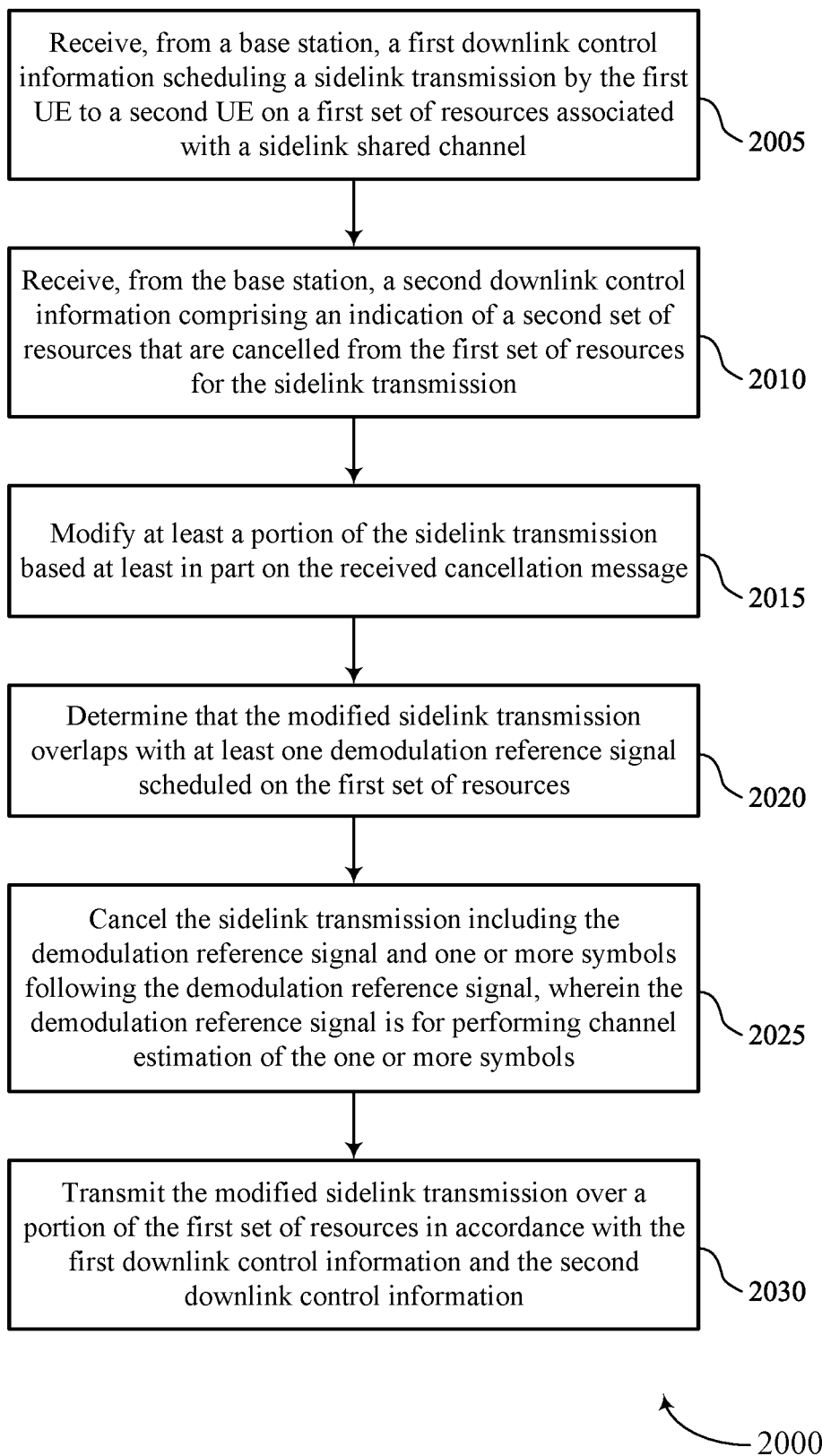

FIG. 20 shows a flowchart illustrating a method 2000 that supports sidelink data cancellation in accordance with aspects of the present disclosure. The operations of the method 2000 may be implemented by a UE or its components as described herein. For example, the operations of the method 2000 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 2005, the method may include receiving, from a base station, a first DCI scheduling a sidelink transmission by the first UE to a second UE on a first set of resources associated with a sidelink shared channel. The operations of 2005 may be performed in accordance with examples as disclosed herein. In some examples, aspects of the operations of 2005 may be performed by a sidelink scheduling component 1025 as described with reference to FIG. 10.

At 2010, the method may include receiving, from the base station, a second DCI including an indication of a second set of resources that are cancelled from the first set of resources for the sidelink transmission. The operations of 2010 may be performed in accordance with examples as disclosed herein. In some examples, aspects of the operations of 2010 may be performed by a sidelink cancellation component 1030 as described with reference to FIG. 10.

At 2015, the method may include modifying at least a portion of the sidelink transmission based on the received second DCI. The operations of 2015 may be performed in accordance with examples as disclosed herein. In some examples, aspects of the operations of 2015 may be performed by a sidelink scheduling component 1025 as described with reference to FIG. 10.

At 2020, the method may include determining that the modified sidelink transmission overlaps with a DMRS scheduled on the first set of resources. The operations of 2020 may be performed in accordance with examples as disclosed herein. In some examples, aspects of the operations of 2020 may be performed by a resource overlap identification component 1040 as described with reference to FIG. 10.

At 2025, the method may include cancelling the sidelink transmission including the DMRS and one or more symbols following the DMRS, where the DMRS is for performing channel estimation of the one or more symbols. The operations of 2025 may be performed in accordance with examples as disclosed herein. In some examples, aspects of the operations of 2025 may be performed by a sidelink cancellation component 1030 as described with reference to FIG. 10.

At 2030, the method may include transmitting the modified sidelink transmission over a portion of the first set of resources in accordance with the first DCI and the second DCI. The operations of 2030 may be performed in accordance with examples as disclosed herein. In some examples, aspects of the operations of 2030 may be performed by a sidelink transmission component 1035 as described with reference to FIG. 10.

Figure 21:
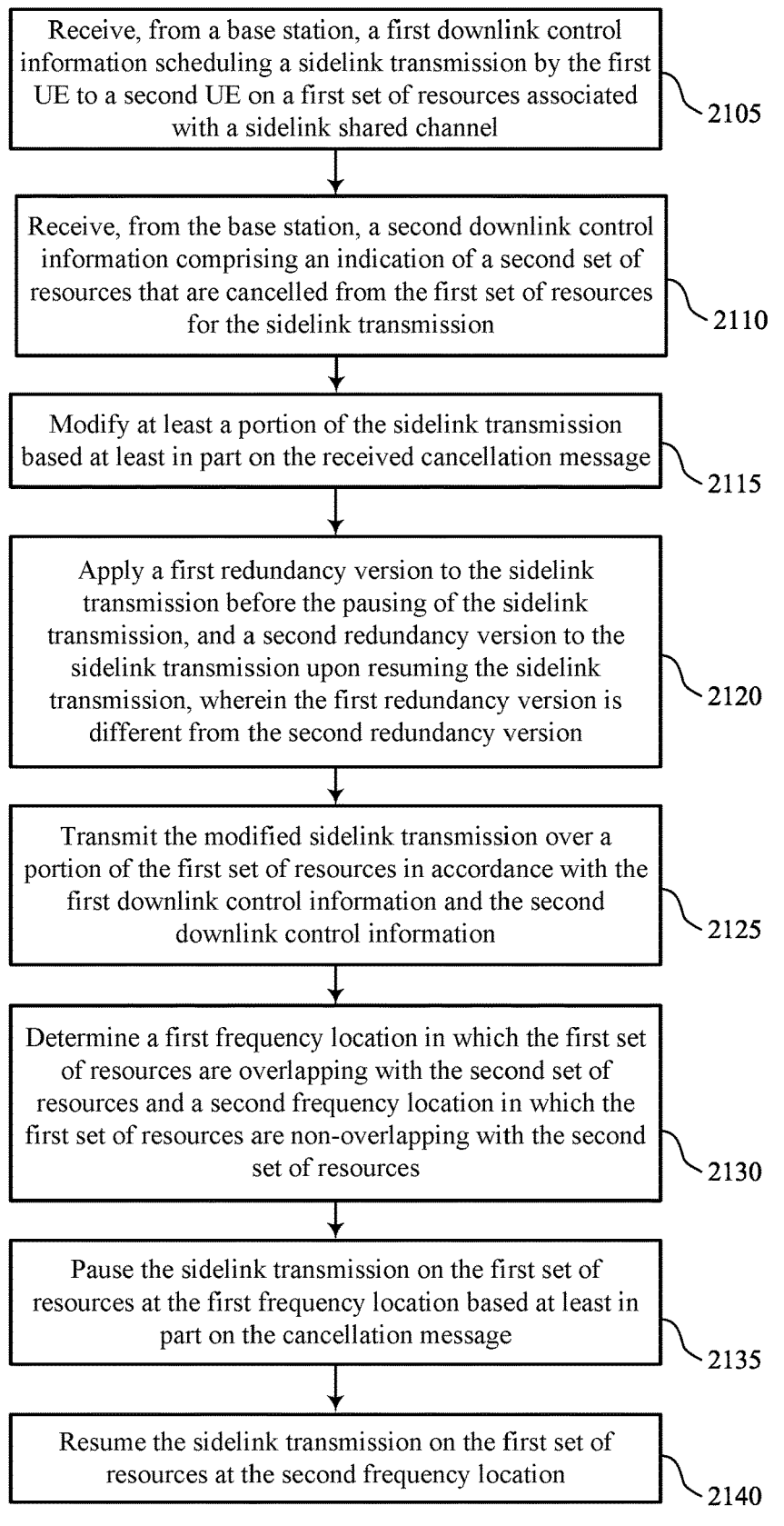

FIG. 21 shows a flowchart illustrating a method 2100 that supports sidelink data cancellation in accordance with aspects of the present disclosure. The operations of the method 2100 may be implemented by a UE or its components as described herein. For example, the operations of the method 2100 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 2105, the method may include receiving, from a base station, a first DCI scheduling a sidelink transmission by the first UE to a second UE on a first set of resources associated with a sidelink shared channel. The operations of 2105 may be performed in accordance with examples as disclosed herein. In some examples, aspects of the operations of 2105 may be performed by a sidelink scheduling component 1025 as described with reference to FIG. 10.

At 2110, the method may include receiving, from the base station, a second DCI including an indication of a second set of resources that are cancelled from the first set of resources for the sidelink transmission. The operations of 2110 may be performed in accordance with examples as disclosed herein. In some examples, aspects of the operations of 2110 may be performed by a sidelink cancellation component 1030 as described with reference to FIG. 10.

At 2115, the method may include modifying at least a portion of the sidelink transmission based on the received second DCI. The operations of 2115 may be performed in accordance with examples as disclosed herein. In some examples, aspects of the operations of 2115 may be performed by a sidelink scheduling component 1025 as described with reference to FIG. 10.

At 2120, the method may include applying a first redundancy version to the sidelink transmission before the pausing of the sidelink transmission, and a second redundancy version to the sidelink transmission upon resuming the sidelink transmission, where the first redundancy version is different from the second redundancy version. The operations of 2120 may be performed in accordance with examples as disclosed herein. In some examples, aspects of the operations of 2120 may be performed by an RV application component 1065 as described with reference to FIG. 10.

At 2125, the method may include transmitting the modified sidelink transmission over a portion of the first set of resources in accordance with the first DCI and the second DCI. The operations of 2125 may be performed in accordance with examples as disclosed herein. In some examples, aspects of the operations of 2125 may be performed by a sidelink transmission component 1035 as described with reference to FIG. 10.

At 2130, the method may include determining a first frequency location in which the first set of resources are overlapping with the second set of resources and a second frequency location in which the first set of resources are non-overlapping with the second set of resources. The operations of 2130 may be performed in accordance with examples as disclosed herein. In some examples, aspects of the operations of 2130 may be performed by a resource overlap identification component 1040 as described with reference to FIG. 10.

At 2135, the method may include pausing the sidelink transmission on the first set of resources at the first frequency location based on the received second DCI. The operations of 2135 may be performed in accordance with examples as disclosed herein. In some examples, aspects of the operations of 2135 may be performed by a sidelink transmission component 1035 as described with reference to FIG. 10.

At 2140, the method may include resuming the sidelink transmission on the first set of resources at the second frequency location. The operations of 2140 may be performed in accordance with examples as disclosed herein. In some examples, aspects of the operations of 2140 may be performed by a sidelink transmission component 1035 as described with reference to FIG. 10.

Figure 22:
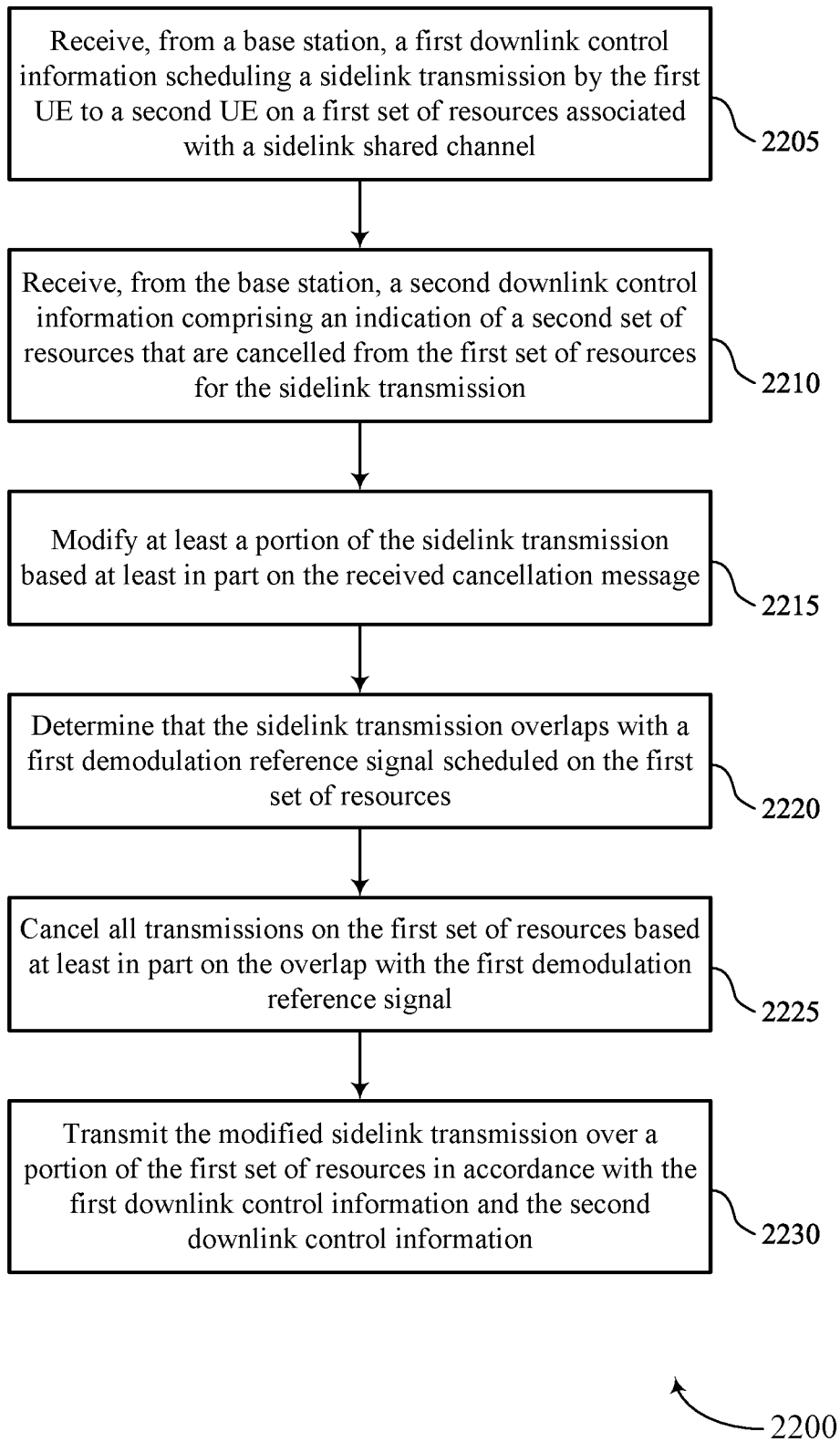

FIG. 22 shows a flowchart illustrating a method 2200 that supports sidelink data cancellation in accordance with aspects of the present disclosure. The operations of the method 2200 may be implemented by a UE or its components as described herein. For example, the operations of the method 2200 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 2205, the method may include receiving, from a base station, a first DCI scheduling a sidelink transmission by the first UE to a second UE on a first set of resources associated with a sidelink shared channel. The operations of 2205 may be performed in accordance with examples as disclosed herein. In some examples, aspects of the operations of 2205 may be performed by a sidelink scheduling component 1025 as described with reference to FIG. 10.

At 2210, the method may include receiving, from the base station, a second DCI including an indication of a second set of resources that are cancelled from the first set of resources for the sidelink transmission. The operations of 2210 may be performed in accordance with examples as disclosed herein. In some examples, aspects of the operations of 2210 may be performed by a sidelink cancellation component 1030 as described with reference to FIG. 10.

At 2215, the method may include modifying at least a portion of the sidelink transmission based on the received second DCI. The operations of 2215 may be performed in accordance with examples as disclosed herein. In some examples, aspects of the operations of 2215 may be performed by a sidelink scheduling component 1025 as described with reference to FIG. 10.

At 2220, the method may include determining that the sidelink transmission overlaps with a first DMRS scheduled on the first set of resources. The operations of 2220 may be performed in accordance with examples as disclosed herein. In some examples, aspects of the operations of 2220 may be performed by a resource overlap identification component 1040 as described with reference to FIG. 10.

At 2225, the method may include cancelling all transmissions on the first set of resources based on the overlap with the first DMRS. The operations of 2225 may be performed in accordance with examples as disclosed herein. In some examples, aspects of the operations of 2225 may be performed by a sidelink cancellation component 1030 as described with reference to FIG. 10.

At 2230, the method may include transmitting the modified sidelink transmission over a portion of the first set of resources in accordance with the first DCI and the second DCI. The operations of 2230 may be performed in accordance with examples as disclosed herein. In some examples, aspects of the operations of 2230 may be performed by a sidelink transmission component 1035 as described with reference to FIG. 10.

Figure 23:
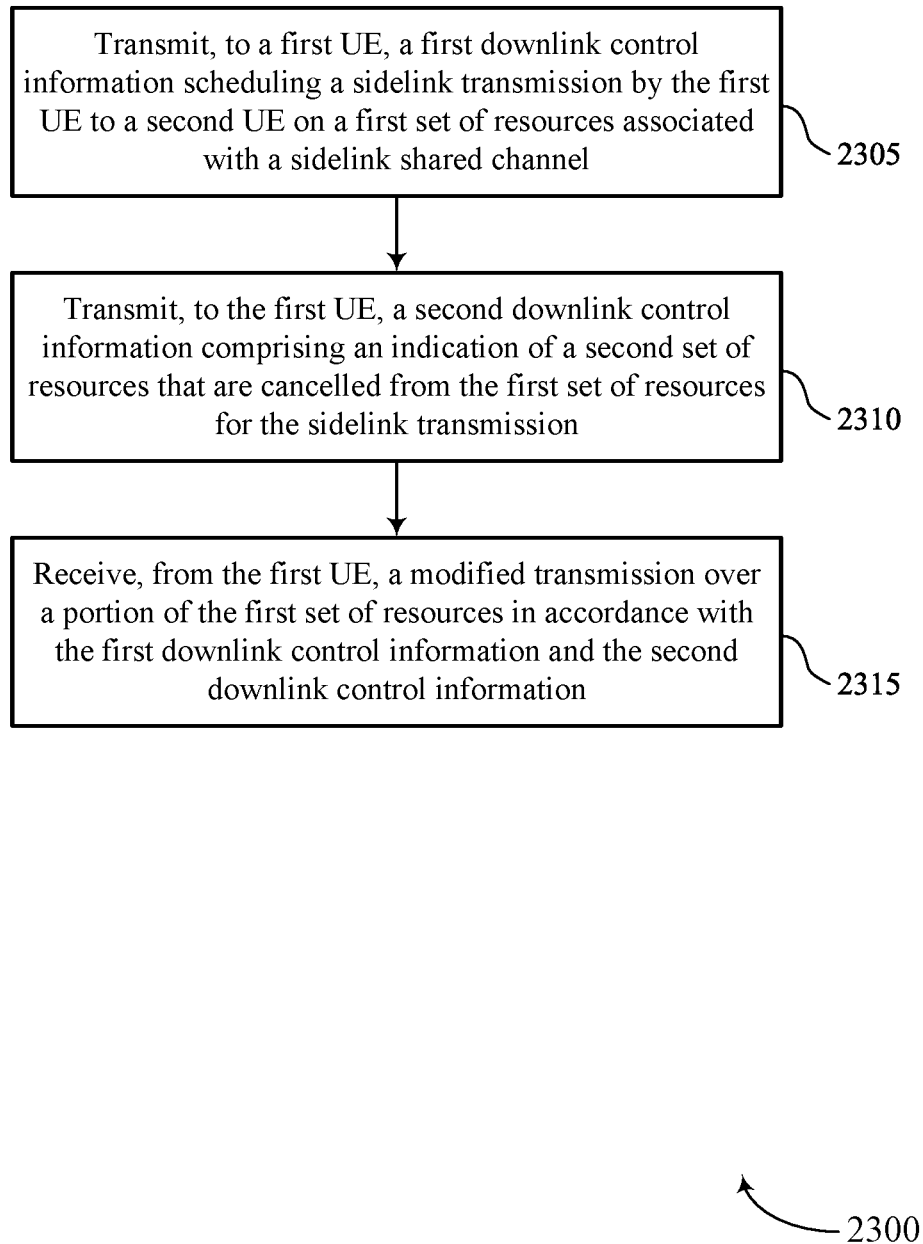

FIG. 23 shows a flowchart illustrating a method 2300 that supports sidelink data cancellation in accordance with aspects of the present disclosure. The operations of the method 2300 may be implemented by a base station or its components as described herein. For example, the operations of the method 2300 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 2305, the method may include transmitting, to a first UE, a first DCI scheduling a sidelink transmission by the first UE to a second UE on a first set of resources associated with a sidelink shared channel. The operations of 2305 may be performed in accordance with examples as disclosed herein. In some examples, aspects of the operations of 2305 may be performed by a sidelink scheduling component 1425 as described with reference to FIG. 14.

At 2310, the method may include transmitting, to the first UE, a second DCI including an indication of a second set of resources that are cancelled from the first set of resources for the sidelink transmission. The operations of 2310 may be performed in accordance with examples as disclosed herein. In some examples, aspects of the operations of 2310 may be performed by a sidelink cancellation indication component 1430 as described with reference to FIG. 14.

At 2315, the method may include receiving, from the first UE, a modified transmission over a portion of the first set of resources in accordance with the first DCI and the second DCI. The operations of 2315 may be performed in accordance with examples as disclosed herein. In some examples, aspects of the operations of 2315 may be performed by a receiver component 1435 as described with reference to FIG. 14.

The following provides an overview of aspects of the present disclosure:

Aspect 1: A method for wireless communications at a first UE, comprising: receiving, from a base station, a first downlink control information scheduling a sidelink transmission by the first UE to a second UE on a first set of resources associated with a sidelink shared channel; receiving, from the base station, a second downlink control information comprising an indication of a second set of resources that are cancelled from the first set of resources for the sidelink transmission; modifying at least a portion of the sidelink transmission based at least in part on the received second downlink control information; and transmitting the modified sidelink transmission over a portion of the first set of resources in accordance with the first downlink control information and the second downlink control information.

Aspect 2: The method of aspect 1, wherein the sidelink transmission comprises a sidelink control transmission, the modifying further comprising: cancelling the sidelink transmission on the first set of resources based at least in part on the first set of resources at least partially overlapping in frequency with the second set of resources.

Aspect 3: The method of any of aspects 1 through 2, wherein the sidelink transmission comprises a sidelink control transmission, the modifying further comprising: determining a first frequency location in which the first set of resources are overlapping with the second set of resources and a second frequency location in which the first set of resources are non-overlapping with the second set of resources; and pausing the sidelink transmission on the first set of resources at the first frequency location based at least in part on the cancellation message; and performing the sidelink transmission on the first set of resources at the second frequency location.

Aspect 4: The method of aspect 3, wherein performing the sidelink transmission on the first set of resources at the second frequency location comprises: transmitting one or more reference signals with the sidelink transmission, wherein the one or more reference signals are for estimating a phase discontinuity based at least in part on the modifying at least a portion of the sidelink transmission.

Aspect 5: The method of any of aspects 1 through 4, wherein the sidelink transmission comprises a sidelink control transmission, the modifying further comprising: shifting a location of one or more information bits included in the sidelink transmission to a non-overlapping symbol on the first set of resources; and cancelling the sidelink transmission on a portion of the first set of resources that is at least partially overlapping in frequency with the second set of resources.

Aspect 6: The method of any of aspects 1 through 5, wherein the sidelink transmission comprises a sidelink control transmission, the modifying further comprising: cancelling the sidelink transmission on a portion of the first set of resources that are at least partially overlapping in frequency with the second set of resources; and rate matching around the cancelled portion of the first set of resources.

Aspect 7: The method of any of aspects 1 through 6, wherein the sidelink transmission comprises a sidelink control transmission, the modifying further comprising: cancelling the sidelink transmission on a portion of the first set of resources that is at least partially overlapping in frequency with the second set of resources, wherein the sidelink transmission comprises one or more sidelink transmissions of a sidelink control channel, the sidelink shared channel, or both.

Aspect 8: The method of any of aspects 1 through 7, further comprising: cancelling the sidelink transmission comprising a sidelink control channel transmission, a sidelink shared channel transmission, or both, that is scheduled to occur before transmission of a demodulation reference signal on the first set of resources.

Aspect 9: The method of any of aspects 1 through 8, wherein the sidelink transmission comprises a sidelink control transmission, the modifying further comprising: determining that the modified sidelink transmission overlaps with a demodulation reference signal scheduled on the first set of resources; and cancelling the sidelink transmission including the demodulation reference signal and one or more symbols following the demodulation reference signal, wherein the demodulation reference signal is for performing channel estimation of the one or more symbols.

Aspect 10: The method of aspect 9, further comprising: cancelling the sidelink transmission based at least in part on a number of symbols associated with the demodulation reference signal, a channel fading rate, or both.

Aspect 11: The method of any of aspects 9 through 10, further comprising: modifying a transmission location of the demodulation reference signal on the first set of resources based at least in part on the cancelling of the sidelink transmission.

Aspect 12: The method of any of aspects 1 through 11, wherein the sidelink transmission comprises a sidelink shared channel transmission, the modifying further comprising: cancelling the sidelink transmission on the first set of resources based at least in part on the first set of resources at least partially overlapping in frequency with the second set of resources.

Aspect 13: The method of any of aspects 1 through 12, wherein the sidelink transmission comprises a sidelink shared channel transmission, the modifying further comprising: determining a channel coherence time of an uplink channel associated with the first set of resources and the second set of resources; and cancelling the sidelink transmission on the first set of resources based at least in part on the channel coherence time.

Aspect 14: The method of any of aspects 1 through 13, wherein the sidelink transmission comprises a sidelink shared channel transmission, the modifying further comprising: determining a first frequency location in which the first set of resources are overlapping with the second set of resources and a second frequency location in which the first set of resources are non-overlapping with the second set of resources; and pausing the sidelink transmission on the first set of resources at the first frequency location based at least in part on the cancellation message; and resuming the sidelink transmission on the first set of resources at the second frequency location.

Aspect 15: The method of aspect 14, further comprising: modifying a location of transmission of a demodulation reference signal on the first set of resources based at least in part on the pausing and resuming of the sidelink shared channel transmission.

Aspect 16: The method of aspect 15, wherein the modifying the location of transmission comprises preponing or postponing transmission of the demodulation reference signal based at least in part on the received second downlink control information.

Aspect 17: The method of any of aspects 14 through 16, further comprising: applying a first redundancy version to the sidelink transmission before the pausing of the sidelink transmission, and a second redundancy version to the sidelink transmission upon resuming the sidelink transmission, wherein the first redundancy version is different from the second redundancy version.

Aspect 18: The method of any of aspects 1 through 17, wherein the sidelink transmission comprises a sidelink shared channel transmission, the modifying further comprising: shifting a location of one or more information bits included in the sidelink shared channel transmission to a non-overlapping symbol on the first set of resources based at least in part on a redundancy version of the sidelink transmission; and cancelling the sidelink transmission on the first set of resources that are at least partially overlapping in frequency with the second set of resources.

Aspect 19: The method of any of aspects 1 through 18, wherein the sidelink transmission comprises a sidelink shared channel transmission, the modifying further comprising: determining that the sidelink transmission overlaps with a demodulation reference signal scheduled on the first set of resources; and cancelling the sidelink transmission including a demodulation reference signal and one or more symbols following the demodulation reference signal, wherein the demodulation reference signal is for channel estimation of the one or more symbols.

Aspect 20: The method of aspect 19, further comprising: cancelling the sidelink transmission based at least in part on a channel coherence time associated with the first set of resources and the second set of resources.

Aspect 21: The method of any of aspects 19 through 20, further comprising: cancelling the sidelink shared channel transmission including the demodulation reference signal and at least a portion of a demodulation reference signal repetition in a previous or subsequent non-overlapping symbol; and modifying a transmission location of the demodulation reference signal on the first set of resources based at least in part on the cancelling of the sidelink transmission.

Aspect 22: The method of aspect 21, wherein the modifying comprises preponing or postponing transmission of the demodulation reference signal based at least in part on the cancellation message.

Aspect 23: The method of any of aspects 1 through 22, wherein the sidelink transmission comprises a sidelink shared channel transmission, the modifying further comprising: determining that the sidelink transmission overlaps with at least one demodulation reference signal scheduled on the first set of resources; and switching a location of a demodulation reference signal with a non-overlapping data symbol; and cancelling the non-overlapping data symbol based at least in part on the switching.

Aspect 24: The method of aspect 23, wherein the non-overlapping data symbol occurs prior to the demodulation reference signal.

Aspect 25: The method of any of aspects 23 through 24, wherein the non-overlapping data symbol occurs after the demodulation reference signal.

Aspect 26: The method of any of aspects 1 through 25, wherein the sidelink transmission comprises a sidelink shared channel transmission, the modifying further comprising: determining that the sidelink transmission overlaps with a first demodulation reference signal scheduled on the first set of resources; and cancelling all transmissions on the first set of resources based at least in part on the overlap with the first demodulation reference signal.

Aspect 27: The method of any of aspects 1 through 26, wherein the first downlink control information comprises a first format of downlink control information for scheduling sidelink communications and the second downlink control information comprises a second format of downlink control information for cancelling sidelink communications.

Aspect 28: A method for wireless communications at a base station, comprising: transmitting, to a first UE, a first downlink control information scheduling a sidelink transmission by the first UE to a second UE on a first set of resources associated with a sidelink shared channel; transmitting, to the first UE, a second downlink control information comprising an indication of a second set of resources that are cancelled from the first set of resources for the sidelink transmission; and receiving, from the first UE, a modified transmission over a portion of the first set of resources in accordance with the first downlink control information and the second downlink control information.

Aspect 29: An apparatus for wireless communications at a first UE, comprising at least one processor; memory coupled with the processor; and instructions stored in the memory and executable by the processor to cause the apparatus to perform a method of any of aspects 1 through 27.

Aspect 30: An apparatus for wireless communications at a first UE, comprising at least one means for performing a method of any of aspects 1 through 27.

Aspect 31: A non-transitory computer-readable medium storing code for wireless communications at a first UE, the code comprising instructions executable by at least one processor to perform a method of any of aspects 1 through 27.

Aspect 32: An apparatus for wireless communications at a base station, comprising at least one processor; memory coupled with the at least one processor; and instructions stored in the memory and executable by the at least one processor to cause the apparatus to perform a method of aspect 28.

Aspect 33: An apparatus for wireless communications at a base station, comprising at least one means for performing a method of aspect 28.

Aspect 34: A non-transitory computer-readable medium storing code for wireless communications at a base station, the code comprising instructions executable by at least one processor to perform a method of aspect 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (e.g., Wi-Fi), IEEE 802.16 (WiMAX), IEEE 802.20, Flash-OFDM, as well as other systems and radio technologies including future systems and radio technologies not explicitly mentioned herein. Components within a wireless communication system may be coupled (for example, operatively, communicatively, functionally, electronically, and/or electrically) to each other.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
   receiving a first downlink control information scheduling a sidelink transmission by the first UE to a second UE on a first set of resources associated with a sidelink shared channel;
   receiving a second downlink control information comprising an indication of a second set of resources that is cancelled from the first set of resources for the sidelink transmission;
   modifying at least a portion of the sidelink transmission based at least in part on the received second downlink control information; and
   transmitting the modified sidelink transmission over a portion of the first set of resources in accordance with the first downlink control information and the second downlink control information.

2. The method of claim 1, wherein the sidelink transmission comprises a sidelink control transmission, the modifying further comprising:
   cancelling the sidelink transmission on the first set of resources based at least in part on the first set of resources at least partially overlapping in frequency with the second set of resources.

3. The method of claim 1, wherein the sidelink transmission comprises a sidelink control transmission, the modifying further comprising:
   determining a first frequency location in which the first set of resources are overlapping with the second set of resources and a second frequency location in which the first set of resources are non-overlapping with the second set of resources;
   pausing the sidelink transmission on the first set of resources at the first frequency location based at least in part on the second downlink control information; and
   performing the sidelink transmission on the first set of resources at the second frequency location.

4. The method of claim 3, wherein performing the sidelink transmission on the first set of resources at the second frequency location comprises:
   transmitting one or more reference signals with the sidelink transmission, wherein the one or more reference signals are for estimating a phase discontinuity based at least in part on modifying at least the portion of the sidelink transmission.

5. The method of claim 1, wherein the sidelink transmission comprises a sidelink control transmission, the modifying further comprising:
   shifting a location of one or more information bits included in the sidelink transmission to a non-overlapping symbol on the first set of resources; and
   cancelling the sidelink transmission on a portion of the first set of resources that is at least partially overlapping in frequency with the second set of resources.

6. The method of claim 1, wherein the sidelink transmission comprises a sidelink control transmission, the modifying further comprising:
   cancelling the sidelink transmission on a portion of the first set of resources that at least partially overlap in frequency with the second set of resources; and
   rate matching around the portion of the first set of resources.

7. The method of claim 1, wherein the sidelink transmission comprises a sidelink control transmission, the modifying further comprising:
   cancelling the sidelink transmission on a portion of the first set of resources that is at least partially overlapping in frequency with the second set of resources, wherein the sidelink transmission comprises one or more sidelink transmissions of a sidelink control channel, the sidelink shared channel, or both.

8. The method of claim 1, further comprising:
   cancelling the sidelink transmission comprising a sidelink control channel transmission, a sidelink shared channel transmission, or both, that is scheduled to occur before transmission of a demodulation reference signal on the first set of resources.

9. The method of claim 1, wherein the sidelink transmission comprises a sidelink control transmission, the modifying further comprising:
   determining that the modified sidelink transmission overlaps with a demodulation reference signal scheduled on the first set of resources; and
   cancelling the sidelink transmission including the demodulation reference signal and one or more symbols following the demodulation reference signal, wherein the demodulation reference signal is for performing channel estimation of the one or more symbols.

10. The method of claim 9, further comprising:
    cancelling the sidelink transmission based at least in part on a number of symbols associated with the demodulation reference signal, a channel fading rate, or both.

11. The method of claim 9, further comprising:
modifying a transmission location of the demodulation reference signal on the first set of resources based at least in part on the cancelling of the sidelink transmission.

12. The method of claim 1, wherein the sidelink transmission comprises a sidelink shared channel transmission, the modifying further comprising:
cancelling the sidelink transmission on the first set of resources based at least in part on the first set of resources at least partially overlapping in frequency with the second set of resources.

13. The method of claim 1, wherein the sidelink transmission comprises a sidelink shared channel transmission, the modifying further comprising:
determining a channel coherence time of an uplink channel associated with the first set of resources and the second set of resources; and
cancelling the sidelink transmission on the first set of resources based at least in part on the channel coherence time.

14. The method of claim 1, wherein the sidelink transmission comprises a sidelink shared channel transmission, the modifying further comprising:
determining a first frequency location in which the first set of resources are overlapping with the second set of resources and a second frequency location in which the first set of resources are non-overlapping with the second set of resources;
pausing the sidelink transmission on the first set of resources at the first frequency location based at least in part on the second downlink control information; and
resuming the sidelink transmission on the first set of resources at the second frequency location.

15. The method of claim 14, further comprising:
modifying a location of transmission of a demodulation reference signal on the first set of resources based at least in part on the pausing and resuming of the sidelink shared channel transmission.

16. The method of claim 15, wherein modifying the location of transmission comprises preponing or postponing transmission of the demodulation reference signal based at least in part on the second downlink control information.

17. The method of claim 14, further comprising:
applying a first redundancy version to the sidelink transmission before the pausing of the sidelink transmission, and a second redundancy version to the sidelink transmission upon resuming the sidelink transmission, wherein the first redundancy version is different from the second redundancy version.

18. The method of claim 1, wherein the sidelink transmission comprises a sidelink shared channel transmission, the modifying further comprising:
shifting a location of one or more information bits included in the sidelink shared channel transmission to a non-overlapping symbol on the first set of resources based at least in part on a redundancy version of the sidelink transmission; and
cancelling the sidelink transmission on the first set of resources that at least partially overlap in frequency with the second set of resources.

19. The method of claim 1, wherein the sidelink transmission comprises a sidelink shared channel transmission, the modifying further comprising:
determining that the sidelink transmission overlaps with a demodulation reference signal scheduled on the first set of resources; and cancelling the sidelink transmission including the demodulation reference signal and one or more symbols following the demodulation reference signal, wherein the demodulation reference signal is for channel estimation of the one or more symbols.

20. The method of claim 19, further comprising:
cancelling the sidelink transmission based at least in part on a channel coherence time associated with the first set of resources and the second set of resources.

21. The method of claim 19, further comprising:
cancelling the sidelink shared channel transmission including the demodulation reference signal and at least a portion of a demodulation reference signal repetition in a previous or subsequent non-overlapping symbol; and
modifying a transmission location of the demodulation reference signal on the first set of resources based at least in part on the cancelling of the sidelink transmission.

22. The method of claim 21, wherein the modifying comprises preponing or postponing transmission of the demodulation reference signal based at least in part on the second downlink control information.

23. The method of claim 1, wherein the sidelink transmission comprises a sidelink shared channel transmission, the modifying further comprising:
determining that the sidelink transmission overlaps with at least one demodulation reference signal scheduled on the first set of resources;
switching a location of a demodulation reference signal with a non-overlapping data symbol; and
cancelling the non-overlapping data symbol based at least in part on the switching.

24. The method of claim 23, wherein the non-overlapping data symbol occurs prior to the demodulation reference signal.

25. The method of claim 23, wherein the non-overlapping data symbol occurs after the demodulation reference signal.

26. The method of claim 1, wherein the sidelink transmission comprises a sidelink shared channel transmission, the modifying further comprising:
determining that the sidelink transmission overlaps with a first demodulation reference signal scheduled on the first set of resources; and
cancelling all transmissions on the first set of resources based at least in part on the overlap with the first demodulation reference signal.

27. The method of claim 1, wherein the first downlink control information comprises a first format of downlink control information for scheduling sidelink communications and the second downlink control information comprises a second format of downlink control information for cancelling sidelink communications.

28. A method for wireless communications, comprising:
transmitting, to a first UE, a first downlink control information scheduling a sidelink transmission by the first UE to a second UE on a first set of resources associated with a sidelink shared channel;
transmitting, to the first UE, a second downlink control information comprising an indication of a second set of resources that is cancelled from the first set of resources for the sidelink transmission; and
receiving, from the first UE, a modified transmission over a portion of the first set of resources in accordance with the first downlink control information and the second downlink control information.

29. An apparatus for wireless communications at a first user equipment (UE), comprising:
- at least one processor;
- at least one memory coupled with the at least one processor; and
- instructions stored in the at least one memory and executable by the at least one processor to cause the apparatus to:
  - receive a first downlink control information scheduling a sidelink transmission by the first UE to a second UE on a first set of resources associated with a sidelink shared channel;
  - receive a second downlink control information comprising an indication of a second set of resources that is cancelled from the first set of resources for the sidelink transmission;
  - modify at least a portion of the sidelink transmission based at least in part on the received second downlink control information; and
  - transmit the modified sidelink transmission over a portion of the first set of resources in accordance with the first downlink control information and the second downlink control information.

30. An apparatus for wireless communications, comprising:
- at least one processor;
- at least one memory coupled with the at least one processor; and
- instructions stored in the at least one memory and executable by the at least one processor to cause the apparatus to:
  - transmit, to a first UE, a first downlink control information scheduling a sidelink transmission by the first UE to a second UE on a first set of resources associated with a sidelink shared channel;
  - transmit, to the first UE, a second downlink control information comprising an indication of a second set of resources that is cancelled from the first set of resources for the sidelink transmission; and
  - receive, from the first UE, a modified transmission over a portion of the first set of resources in accordance with the first downlink control information and the second downlink control information.

* * * * *